(12) United States Patent
Palmer

(10) Patent No.: US 6,253,126 B1
(45) Date of Patent: ***Jun. 26, 2001

(54) METHOD AND APPARATUS FOR FLIGHT PARAMETER MONITORING AND CONTROL

(75) Inventor: Steven D. Palmer, Burlington, IA (US)

(73) Assignee: AERS/Midwest, Inc., Burlington, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/076,376

(22) Filed: May 12, 1998

Related U.S. Application Data

(63) Continuation of application No. 08/208,455, filed on Mar. 9, 1994, now Pat. No. 5,796,612, which is a continuation-in-part of application No. 07/978,347, filed on Nov. 18, 1992, now Pat. No. 5,457,630.

(51) Int. Cl.[7] ................. G06F 7/70; G06F 7/76
(52) U.S. Cl. ................. 701/14; 701/3; 701/4; 701/10; 701/15; 701/7; 244/158 R; 244/203; 340/959; 73/178 T
(58) Field of Search .................. 701/3, 14, 15, 701/4, 6, 8, 171, 10, 11, 7; 244/134 F, 75 R, 12.1, 199, 36, 76 R, 53 B, 203–208, 214, 45 R, 164, 194, 195; 73/178 R, 178 T; 454/74, 71; 340/945, 963, 959, 967; 702/138, 140; 180/116, 117

(56) References Cited

U.S. PATENT DOCUMENTS

| | | |
|---|---|---|
| 2,601,962 | 7/1952 | Douglas . |
| 2,744,698 | 5/1956 | Baynes . |
| 2,950,879 | 8/1960 | Smith . |
| 3,142,457 | 7/1964 | Quenzler . |
| 3,646,811 | 3/1972 | DeLeo et al. . |
| 3,691,356 | 9/1972 | Miller . |
| 3,908,783 | 9/1975 | Joerg et al. . |
| 4,110,605 | 8/1978 | Miller . |
| 4,122,522 | 10/1978 | Smith . |
| 4,194,707 | 3/1980 | Sharpe . |
| 4,202,518 | 5/1980 | Burnham et al. . |
| 4,235,104 | 11/1980 | Hoadley et al. ................. 73/180 |
| 4,350,314 | 9/1982 | Hoadley ................. 244/1 R |
| 4,490,802 | 12/1984 | Miller . |

(List continued on next page.)

FOREIGN PATENT DOCUMENTS

| | | |
|---|---|---|
| 365 700 | 5/1990 | (EP) . |
| 955922 | 4/1964 | (GB) . |
| 1120990 | 12/1983 | (GB) . |

OTHER PUBLICATIONS

AIAA AIAA–94–0800 Effect of Initial Ice Roughness on Airfoil Aerodynamics, M. Bragg et al., 32$^{nd}$ Aerospace Sciences Meeting and Exhibit, Jan. 10–13, 1994, pp. 1–19.

(List continued on next page.)

*Primary Examiner*—Jacques H. Louis-Jacques
(74) *Attorney, Agent, or Firm*—Wallenstein & Wagner, Ltd.

(57) ABSTRACT

Methods and apparatus are disclosed for three-dimensional flight control based generally upon measuring and comparing actual air pressures at or near various surfaces of an aircraft during flight. Sensors are provided for measuring air pressure acting on an aircraft surface. The methods and apparatus include those for measuring air pressure differentials between two or more sensors to evaluate certain critical flight parameters, such as the actual lift being produced, the air direction and speed relative to the aircraft, the air density, and the aircraft position and trajectory. The actual and comparative data provide information about the present flight conditions and performance of the aircraft, such as whether there is ice formed or forming on the wings, the direction and approach of wind shear, whether a stall is approaching, etc. The information can be evaluated by a computer, the aircraft's automatic flight control system ("AFCS"), or flight crew so that appropriate flight control measures can be taken.

8 Claims, 16 Drawing Sheets

U.S. PATENT DOCUMENTS

| | | | |
|---|---|---|---|
| 4,506,851 | * 3/1985 | Gupta et al. ................... 244/129.1 |
| 4,516,124 | 5/1985 | Shannon et al. . |
| 4,553,474 | 11/1985 | Wong et al. . |
| 4,559,822 | 12/1985 | Huntington . |
| 4,586,140 | 4/1986 | Millen . |
| 4,645,517 | * 2/1987 | Hagen et al. ........................ 55/182 |
| 4,728,951 | 3/1988 | Johnson et al. . |
| 4,775,118 | 10/1988 | Daniels . |
| 4,837,695 | 6/1989 | Baldwin . |
| 4,843,554 | 6/1989 | Middleton et al. . |
| 4,886,224 | 12/1989 | Joy . |
| 4,899,284 | 2/1990 | Lewis et al. . |
| 4,936,142 | 6/1990 | Davidson . |
| 4,972,672 | * 11/1990 | Sanderson et al. ............. 60/39.092 |
| 4,979,699 | 12/1990 | Tindell . |
| 4,980,833 | 12/1990 | Milligan et al. . |
| 5,016,837 | 5/1991 | Willis . |
| 5,037,044 | 8/1991 | Seyfang . |
| 5,047,942 | 9/1991 | Middleton et al. . |
| 5,071,088 | 12/1991 | Betts . |
| 5,082,207 | 1/1992 | Tulinius . |
| 5,083,279 | 1/1992 | Burdoin . |
| 5,103,224 | 4/1992 | Arad . |
| 5,156,358 | 10/1992 | Gerhardt . |
| 5,158,251 | 10/1992 | Taylor . |
| 5,186,415 | 2/1993 | Li . |
| 5,191,791 | 3/1993 | Gerardi et al. . |
| 5,201,829 | 4/1993 | Peters, Jr. . |
| 5,243,339 | 9/1993 | Graham et al. . |
| 5,275,358 | 1/1994 | Goldhammer et al. . |
| 5,354,015 | 10/1994 | Meador . |
| 5,404,676 | * 4/1995 | Devlin ................................. 49/463 |
| 5,457,630 | * 10/1995 | Palmer ................................. 701/3 |
| 5,457,634 | 10/1995 | Chakravarty . |
| 5,458,304 | 10/1995 | Gilbert . |
| 5,737,222 | * 4/1998 | Palmer ................................. 701/4 |
| 5,796,612 | * 8/1998 | Palmer ................................. 701/4 |
| 6,002,972 | * 12/1999 | Palmer ................................ 701/14 |

OTHER PUBLICATIONS

Maximum Lift Degradation Due to Wing Upper Surface Contamination, Walter O. Valarezo, Nov. 1993, Montreal, Canada.

Journal of Aircraft, Sep.–Oct. 1993, vol. 30, No. 5, pp. 689–694.

AIAA AIAA–93–3534 Navier–Stokes Applications to High–Lift Airfoil Analysis, W. O. Valerezo et al., AIAA $11^{th}$ Applied Aerodynamics Conference, Aug. 9–11, 1993, pp. 1–12.

AIAA AIAA–93–3136 Topics in High–Lift Aerodynamics, Walter O. Valerezo, AIAA $24^{th}$ Fluid Dynamics Conference, Jul. 6–9, 1993, pp. 1–15.

AIAA AIAA–92–0401 Maximum Lift Prediction for Multielement Wings, W. O. Valerezo et al., $30^{th}$ Aerospace Sciences Meeting and Exhibit, Jan. 6–9, 1992, pp. 1–13.

"Airfoil Probe for Angle–of–Attack Measurement", Journal of Aircraft, Jan. 1984, vol. 21, No. 1.

NACA Report No. 590, "Pressure–Distribution Measurements on an O–2H Airplane in Flight" by H. A. Pearson, 1937, pp. 319–324 and 339–341 and 349.

National Advisory Committee for Aeronautics, Wartime Report, originally issued Apr. 1945 as Advance Restricted Report 4K09, "Measurements in Flight of the Pressure Distribution on the Right Wing of a P–39N–1 Airplane at Several Values of Mach Number" by Lawrence A. Clousing, William N. Turner and L. Stewart Rolls, Ames Aeronautical Laboratory, Moffett Field, California, pp. A–13, unnumbered page, and pages 4 and 5 (Copy attached was copied from microfiche).

* cited by examiner

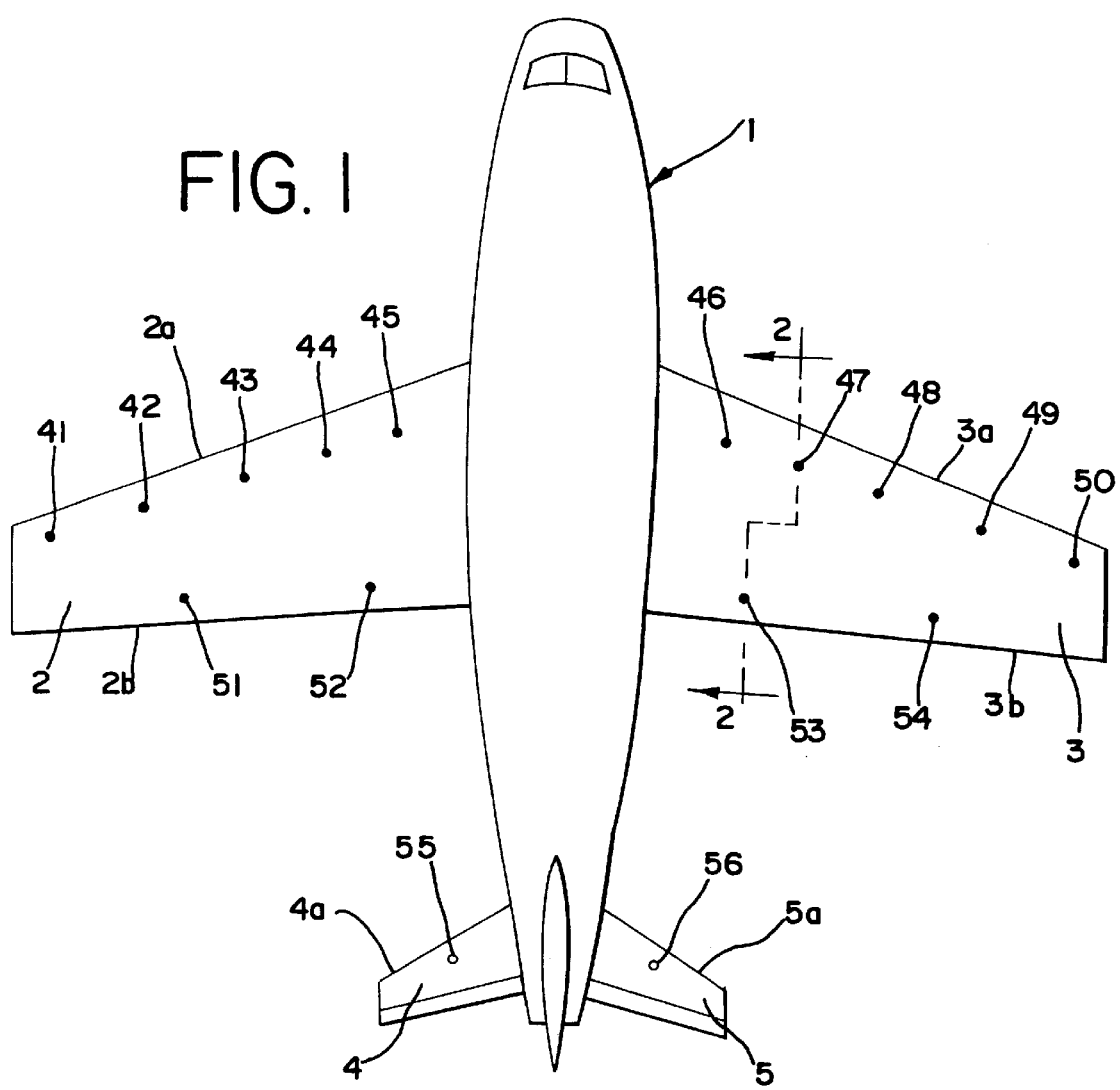
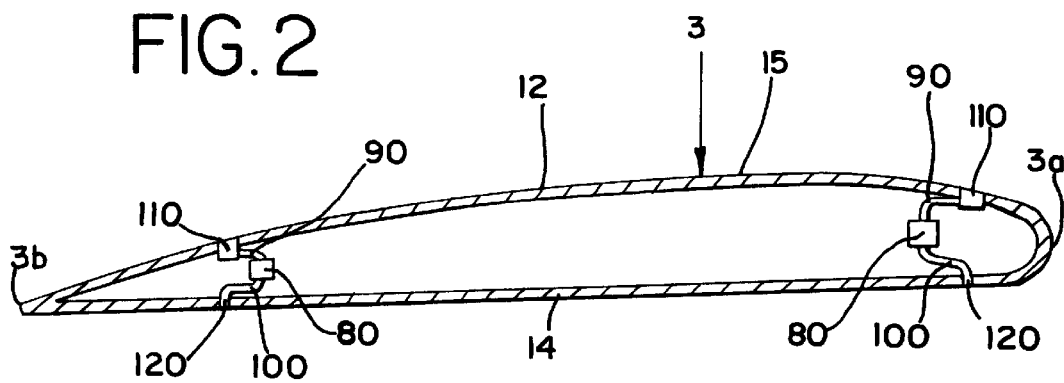

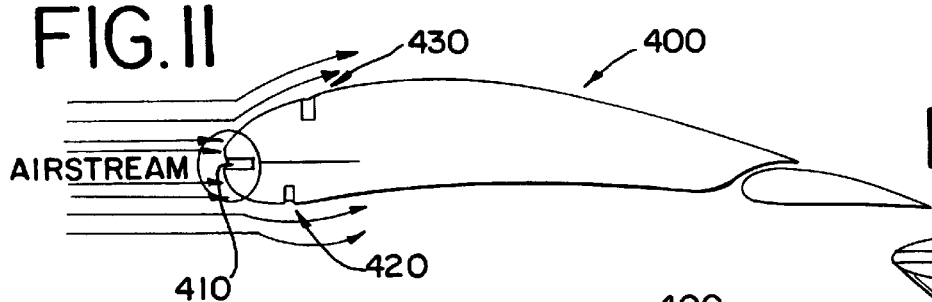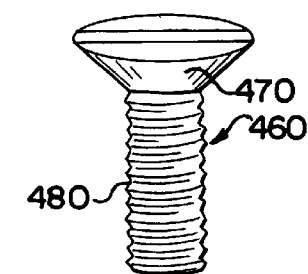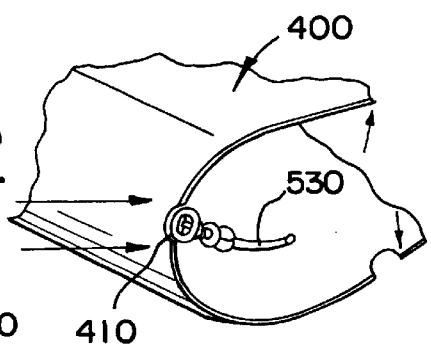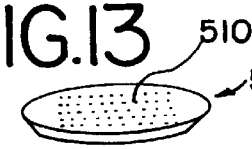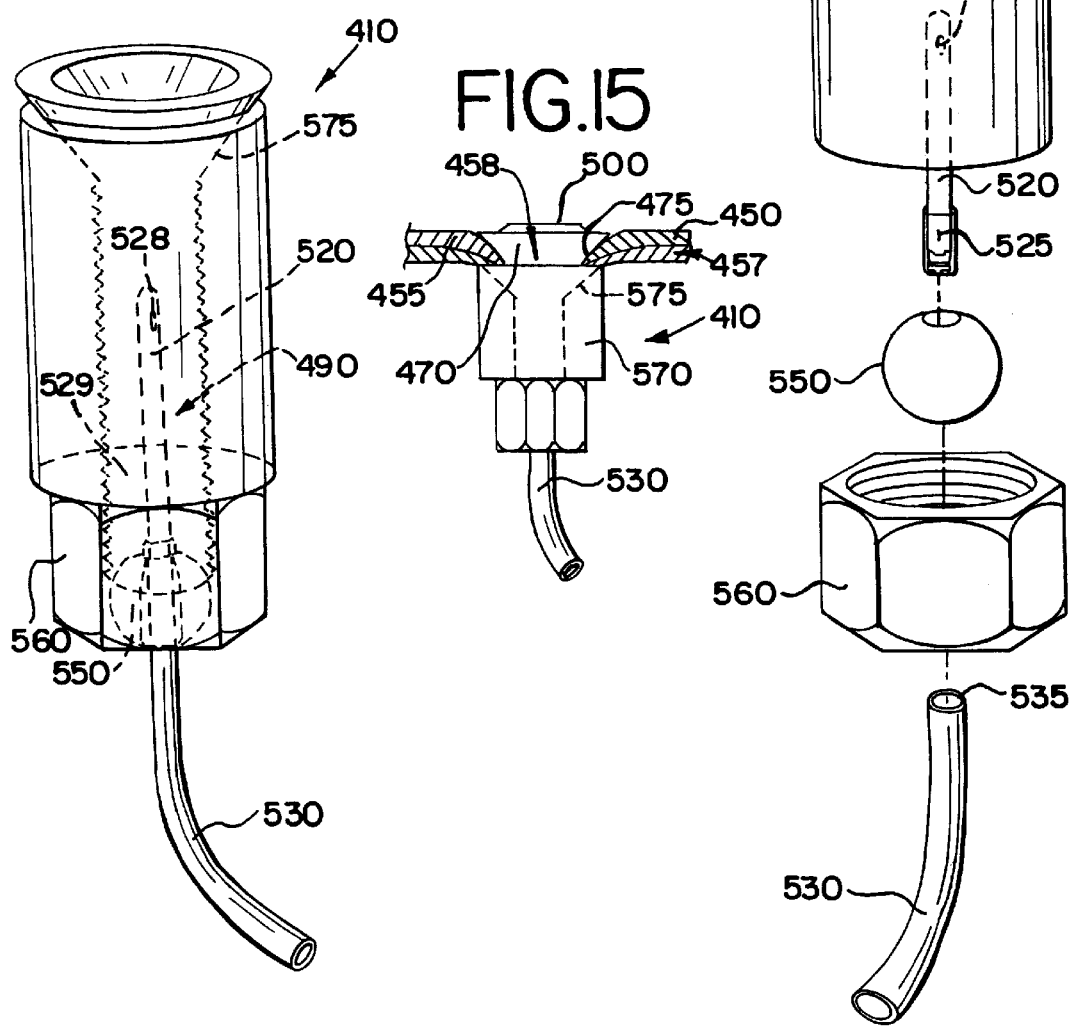

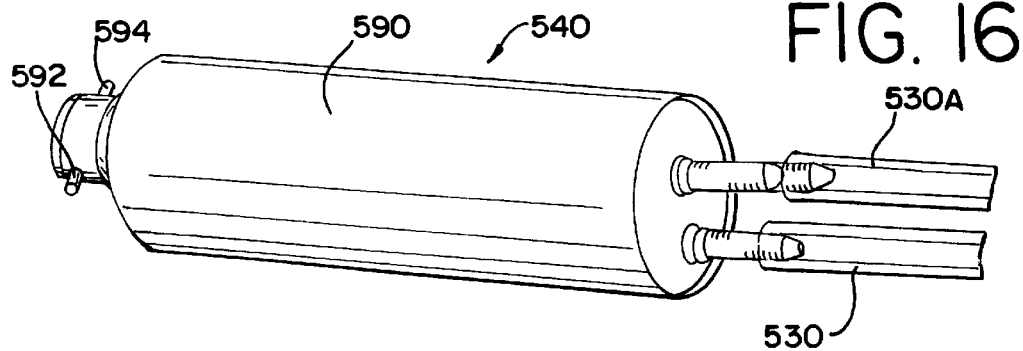
FIG. 16
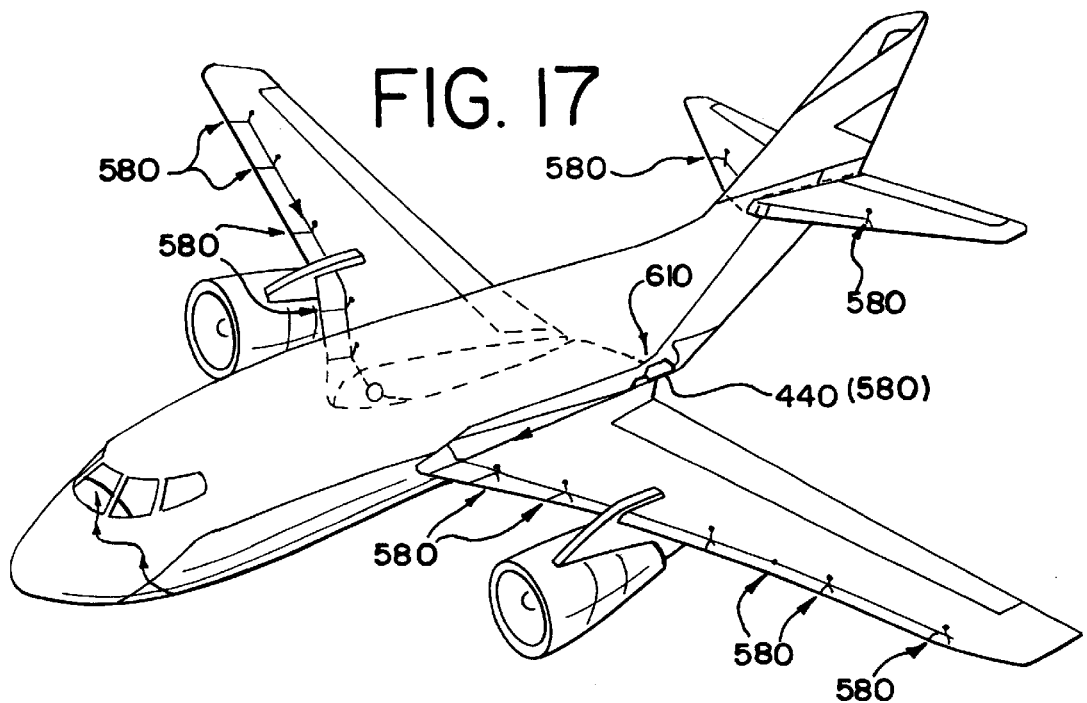
FIG. 17
FIG. 18
| WARNING LINES | | | |
|---|---|---|---|
| SPEED | KPH | COMP. LIFT | % |
| ALTITUDE | FEET/METER | LEFT LIFT | % |
| HEADING | % | RIGHT LIFT | % |
| ATTACK ANGLE | % | BALANCE | % |
| SLIP | % | SYSTEM | % |
| | |
|---|---|
| SENSORS | ON/OFF |
| HEATERS | ON/OFF |
| ZERO STATUS | 1-18 |

LIFT EFFECT DUE TO SIMULATED FROST
GROUND TEST

CW = CLEAN WING    SP = SANDPAPER

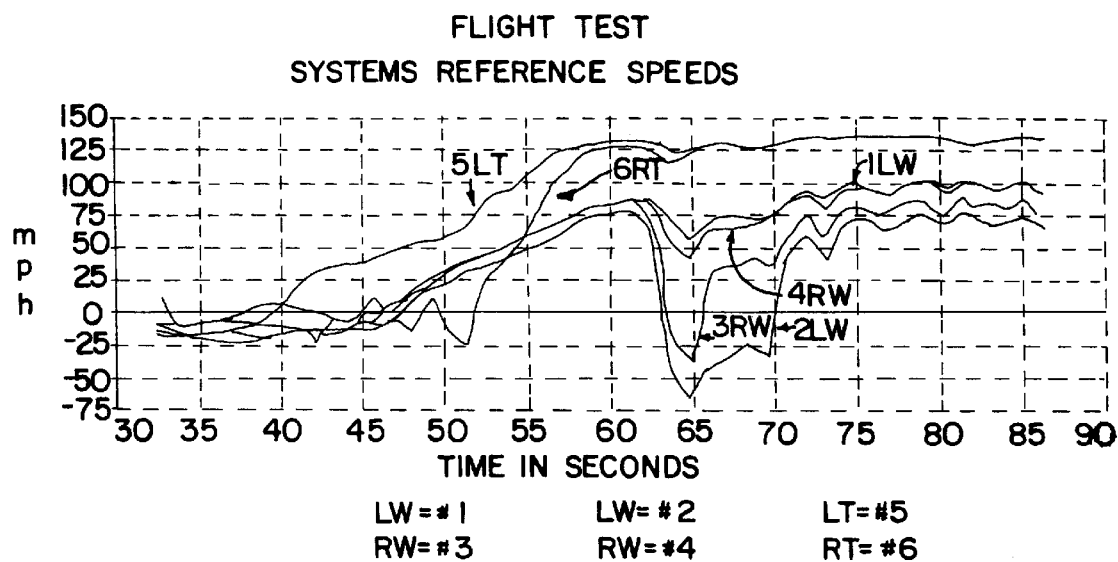
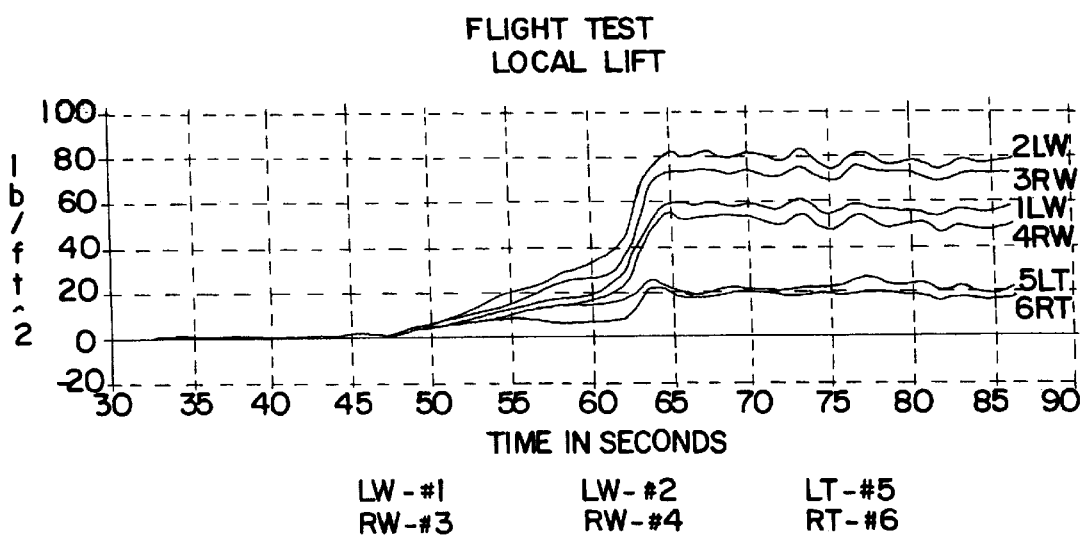

METHOD AND APPARATUS FOR FLIGHT PARAMETER MONITORING AND CONTROL

RELATED APPLICATIONS

This is a continuation of application Ser. No. 08/208,455 filed Mar. 9, 1994, now U.S. Pat. No. 5,796,612, which is a continuation-in-part of application Ser. No. 07/978,347, filed Nov. 18, 1992, now U.S. Pat. No. 5,457,630.

TECHNICAL FIELD

The present invention relates generally to avionics and sensors for monitoring aircraft flight parameters. More particularly, it relates to methods and apparatus for three-dimensional flight parameter analysis, monitoring, acting on, and control based upon in-flight measuring, and comparing of air pressures acting on various surfaces of an aircraft and controlling the aircraft in relation to same.

BACKGROUND OF THE INVENTION

Atmospheric pressures acting upon the various surfaces of an aircraft are determinative of the performance of aircraft. Indeed, flight itself is predominantly a function of the interaction of the aircraft outer surfaces with air. For example, lift is caused by the differential between air pressure acting on the upper and lower surfaces of the aircraft wings in the wind stream.

For these reasons, the aircraft and airline industries have dedicated large amounts of time and money to develop means for monitoring flight performance and detecting lift-robbing wing contaminants, such as Type II fluids and ice, wind shear, microbursts and other adverse air conditions. Examples of such systems and apparatus are described in U.S. Pat. Nos. 3,691,356; 4,110,605; 4,490,802; 4,728,951; 4,775,118; 4,837,695; 4,843,554; 4,980,833 and 5,047,942 the disclosures of which are incorporated by reference herein.

In spite of the importance of air pressure acting on the surface of an aircraft, none of the references disclose a method or apparatus to directly measure or analyze the actual pressures acting on the surface of an aircraft.

In addition, no system or apparatus utilizes pressure development data in conjunction with Advanced Flight Control Systems (AFCS) to control the aircraft or transmit this data to ground personnel for evaluation of flight performance and abnormalities in pressure development.

The present invention is provided to solve these and other problems.

SUMMARY OF THE INVENTION

According to a primary aspect of the invention, the actual air pressure acting on the outer surfaces of an aircraft during operation is measured. Other aspects of the invention include, measuring and monitoring the actual air pressure acting at the surface of the aircraft, in substantially real-time during the flight and using the measured air pressure values to monitor and control flight conditions.

Still other aspects of the invention, include measuring an actual air pressure differential acting between the air pressure acting on two outer surfaces of an aircraft during operation is measured. Another aspect of the invention, measuring and monitoring the actual air pressure differential measurements in essentially real-time during the flight.

According to another aspect of the invention, the measured air pressure differential values are used to monitor and control flight conditions. For example, according to another aspect of the invention, the actual air pressure differential between the air pressure acting on the upper surface of a wing portion and the air pressure acting on the lower surface of the wing portion. This differential pressure measurement corresponds to the lift encountered by that wing portion. The lift values can then be monitored and used to control flight.

According to yet another aspect of the invention, the actual air pressure differential is measured between the static air pressure within an unpressurized area of the aircraft, such as the cargo bay of the fuselage, and the air pressure acting at or near a stagnation point of the leading edge of any other surface of the aircraft, such as the leading edge of the wing, or the leading edge of the nose cowl, or the leading edge of the tail fin. These differential values are monitored and can be used to determine the air speed and air direction and to control flight as discussed in more detail below.

According to another aspect of the invention, methods and apparatus are provided for measuring the actual air pressures and the actual air pressure differentials. For example, according to one aspect of the invention, small openings or ports are provided in the skin of the aircraft. The ports are connected by an air pressure conduit to a means for sensing a pressure and providing a signal related to the pressure. The ports are permeable by air and sensitive to the air pressure changes associated with flight at aircraft standstill to subsonic, supersonic and hypersonic speeds. At the same time, theses ports are provided with means to deter access through the port of extraneous matter such as water and its vapor, lubrication and deicing fluids, and particulates. Means are also provided to prevent icing of the port and to decontaminate the port; for example, a port heater and a sump volume is provided in a preferred embodiment. Preferably, the ports are flush with the outer surface of the aircraft so as not to cause local drag or other flow stream defects which could effect measurements or cumulatively effect flight efficiency. Means for assessing the signal and reporting data are operatively connected to the pressure sensing means. Means are provided for reporting the data optionally to the flight crew or to the aircraft's other flight control and monitoring systems or both.

In another aspect of the invention a matrix of ports and corresponding sensors are provided and the air pressures are measured and selectively compared with respect to each other to optionally assess two or three dimensional components of the air pressures acting over the aircraft at one time.

It is also contemplated that the conduit leading from the ports to the air pressure sensors can also be connected in either serial as opposed to discrete parallel connection. For example, the serial connection would provide an air pressure manifold with numerous ports contributing to a total manifold pressure.

Methods and apparatus are also provided for using the air pressure measurements for controlling flight. For example, according to other aspects of the invention, a method of using the air pressure measurements is to measure the actual air pressure during a first flight condition, then record or store the measured actual air pressure data for the first condition. Then, measure the air pressure during a second flight condition and compare the measurements from the first and second flight conditions during the second flight as the second flight measurements are developed. Preferably, the first flight condition is an acceptable one, such as a clean wing condition, proper lift, no wing defects, no wind shear, etc.

According to another method of the invention, flight control is accomplished by calculating values from the measured air pressures or measured pressure differentials. For example, if one can measure air pressures in real time, one can determine many things about the aircraft performance through comparative mathematical analysis. If, for instance, one has the air speed and knows the pressure reading at two precisely selected locations on the wing and what position the flight control surfaces are in, then determining the correct angle of attack is a relatively easy task. So is it easy to surmise as to the actual margin to stall that the wing has remaining to operate in.

Other aerodynamic performance data can be deduced from this type of accurate real-time data acquisition and analysis. It would be possible to establish a program subroutine that could identify wind shear and surmise its potential impact on the aircraft's flight path. This could be accomplished before the air crew is even aware that they have encountered a wind shear. In such a situation, it would be possible to integrate this aerodynamic performance monitoring capability with the aircraft's automated flight controls, so as to ameliorate the effects of the shears, thereby lessening the potential for disaster somewhat. This would be particularly true in the presence of a side shear occurring at low levels.

Further, it would be possible through integration to determine if the correct landing and takeoff configurations had been implemented early on. The accident at Detroit, where the crew inadvertently did not extend the flaps during their takeoff roll, would be clearly and instantaneously identifiable to such a system as the present invention.

Further, by actually measuring the impact of side slip forces as forces rather than deviations from a charted course should significantly enhance enroute fuel economies. The ability of certain high-performance aircraft to operate closer to the margin during takeoff and climb maneuvers would also significantly impact fuel consumption figures.

Additional benefits that might be expected to eventually be derived from the incorporation of the invention into the flight management and control systems are a far better judgment as to the respective engine performance during everyday flights compared to the normal baseline for such an engine. Should the engine begin to falter, the technology of the present invention should prove to be a valuable tool for monitoring the fall-off in performance, so that quick remedial actions may be taken.

It is the proven ability of the invention to accomplish this type of data acquisition and analysis in virtual real-time that makes it such an important and significant addition to the world of advanced avionics.

Certainly, the technology of the present invention can greatly speed normal development testing of either aircraft modifications or of new aircraft. Further, it is possible to more precisely affix the cause of an accident if one has better aerodynamic performance data from which to study the accident from the aircraft's perspective.

Apparatus according to the invention is designed to measure in virtual real-time the aerodynamic performance in such a manner that all of the above, and many more things, can be done automatically, or at least provide the flight crew with time critical data and analysis materials, so that they can better perform their assigned tasks.

Other advantages and aspects of the present invention will become apparent upon reading the following description of the drawings and detailed description of the invention.

BRIEF DESCRIPTION OF THE DRAWINGS

FIG. 1 is a top view showing an array of lift and pressure sensor mechanisms spaced across the wings and tail sections of an aircraft.

FIG. 2 is a cross-sectional view of a wing showing leading edge, trailing edge and middle pressure sensor mechanisms.

FIG. 11 is a cross-sectional plan view of a wing embodying air pressure sampling ports, according to one embodiment of the invention.

FIG. 12 is a perspective cut-away view of the wing section of FIG. 11, showing a leading edge sampling port.

FIG. 13 is a partial cross-sectional, partial exploded side view of a sampling port, according to the present invention.

FIG. 14 is an exploded view of the sampling port of FIG. 13.

FIG. 15 is a side view, in partial ghost cross-section, showing the sampling port mounted in a skin of an air foil.

FIG. 16 is a perspective view of an air pressure differential sensor cell of the piezoelectric type.

FIG. 17 is a perspective view showing in ghost and cut-away the preferred placement of sensor ports, according to one embodiment of the present invention.

FIG. 18 is a plan view of one embodiment of a human-readable warning and control screen.

FIG. 21 is a graph entitled "Flight Test-System Reference Speeds," disclosing data and data formats according to an aspect of the invention.

FIG. 22 is a graph entitled "Flight Test-Local Lift," disclosing data and data formats according to an aspect of the invention.

DETAILED DESCRIPTION

Figure 3:
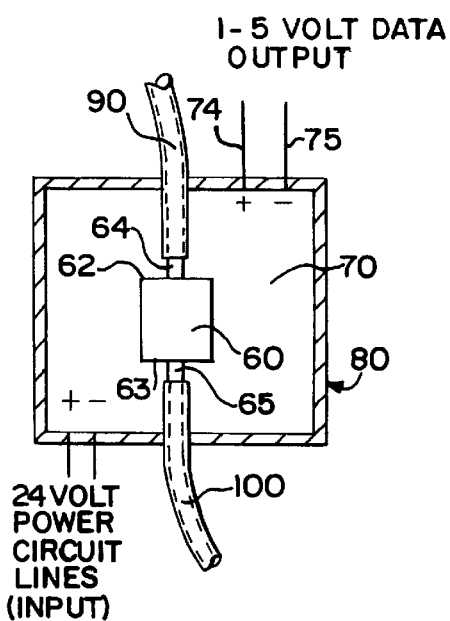
FIG. 3 is an enlarged top sectional view of a leading edge or trailing edge sensor housing containing a piezoelectric differential pressure sensor mounted on a circuit board.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Accordingly, FIGS. 1–10 disclose a preferred method and apparatus defining a system for measuring and analyzing lift contemporaneously before and during flight. FIGS. 11–38 disclose other preferred methods and apparatus defining a system for determining measuring and monitoring lift, air speed and direction, and flight parameters which can be calculated or otherwise determined from and in connection with data from the system. While development is still ongoing, it is believed the preferred embodiments can provide real time analysis of a variety of performance and safety related Items among the systems features are the following: ice detection—both in air and on the ground; stall margin analysis—actual measurement of margins to stall; wind shear analysis and amelioration; side slip; wind impact analysis—on ground and in the air; fought monitoring—both atmospheric and performance related; enhanced CAT-3 performance; critical systems backup; sophisticated data acquisition of virtually all aircraft related performance indicators; contaminant or structural impairments to lift; airframe modification analysis and data acquisition; airspeed indications; and, attitude monitoring. Enhanced margins of safety are also possible during CAT-3 instrument approaches.

FIG. 1 shows an aircraft 1 with two wings 2 and 3 and two tail sections 4 and 5. The wings and tail sections 2–5 comprise the lift surfaces or airfoils of the aircraft. As shown in FIG. 2, each airfoil 2–5 has an upper lift surface 12 and a lower lift surface 14.

The aircraft 1 is equipped with an array of sixteen lift sensor mechanisms 41–56 located in airfoils 2–5 for measuring lift. Ten sensors 41–50 are located near leading edges 2a and 3a of wings 2 and 3. Four sensors 51–54 are located near the trailing edges 2b and 3b of wings 2 and 3. Two sensors 55 and 56 are located near the leading edges 4a and 5a of the tail sections 4 and 5. Although sixteen lift sensors are shown, it should be understood that more or fewer sensors could be used and the placement of the sensors may vary for a particular aircraft. In addition, although the sensor mechanisms 41–56 are shown and described as being in communication with both upper and lower lift surfaces 12 and 14 to measure the pressure differential between those surfaces, it should be understood that the broad aspect of the invention could utilize only the upper lift surfaces 12, with the pressures for the lower lift surfaces 14 being provided by some other means, such as a hypothetical data base.

The aircraft 1 is also equipped with an array of twenty-four pressure sensor mechanisms 141–164 located in airfoils 2–5 for measuring the pressures acting on these surfaces. Pressure sensor mechanisms 141–164 are similar to the lift sensor mechanisms 41–56 except that they communicate with only one surface 12 or 14. Sixteen sensors 141–148 are located inside a middle portion of the wings 2 and 3. Eight sensors 141–148 communicate with the upper lift surfaces 12 and Eight sensors 149–156 communicate with the lower lift surfaces 14. Eight pressure sensors 157–164 are also located inside a middle portion of the tail sections 4 and 5 of the aircraft. Four sensors 157–160 communicate with the upper surfaces 12 and four sensors 161–164 communicate with the lower surfaces 14. Although twenty-four pressure sensors are shown, it should be understood that more or fewer sensors could be used and the placement of the sensors may vary for a particular aircraft. In addition, although pressure sensor mechanisms 141–164 are shown and described as communicating with lift surfaces 12 and 14, it should be understood that these sensors could communicate with non-lift surfaces such as the nose, fuselage or rudder of the aircraft.

As shown in FIGS. 2–5, each lift sensor mechanism 41–56 comprises a pressure sensor 60, a circuit board 70, a housing 80, upper and lower tubes 90 and 100, an upper chamber 110 and a lower orifice 120. The actual pressure being exerted on upper lift surface 12 is communicated through chamber 110 and tube 90 to one side 62 of sensor 60. The actual pressure being exerted on lower lift surface 14 is communicated through orifice 120 and tube 100 to a second side 63 of sensor 60. In this way, sensor 60 measures the actual differential pressure between upper and lower lift surfaces 12 and 14.

As shown in FIG. 2, each sensor mechanism 41–56 and 141–164 is mounted inside airfoils 2–5. An internal mount protects sensor 60 and circuit board 70, does not alter the desired shape of lift surfaces 12 and 14 and provides installation flexibility. Installation flexibility is important because there are typically only a minimal amount of available locations for mounting pressure sensor mechanisms 41–56 inside airfoils 2–5.

As shown in FIGS. 3 and 3a, lift sensor 60 and pressure sensor 61 are preferably standard meteorological piezoelectric sensors. Sensors 60 and 61 have a voltage output in the range of about 1–5 volts for a change in differential pressure of about 5 psi. These sensors are sold by Foxbureau-ITC, Inc., of San Jose, Calif. as Model No. 2010. Similar sensors are also available from Aerospace Systems of Mesa, Ariz.

Sensors 60 and 61 are mounted on circuit board 70 which receives and modifies the output of the sensors. Circuit board 70 converts the typically nonlinear sensor output to a smooth linear signal and may amplify the output of the sensor. Sensors 60 and 61 and circuit board 70 run off a 24 volt power supply and draw an average of about 50–60 milliwatts to facilitate hook up to a typical aircraft electrical system. The voltage drop across positive output lead 74 and negative output lead 75 of sensor 60 provides a measurement of the differential pressure or lift between upper and lower surfaces 12 and 14. The voltage drop across positive output lead 74 and negative output lead 75 of sensor 61 provides a measurement of the pressure acting on upper surface 12 or lower surface 14. The negative output lead 75 of each sensor mechanism 41–56 and 141–164 is connected to a common ground.

Housing 80 encloses and protects sensor 60 or 61 and circuit board 70. Housing 80 has a volume of about one and a half cubic inches as sensor 60 or 61 and circuit board 70 are commercially available in miniaturized form. Tubes 90 and 100 fit through a pair of holes in the housing 80. A heater (not shown) may be provided to heat housing 80 to ensure that sensor 60 or 61 and circuit board 70 remain at a substantially constant temperature. Maintaining a constant temperature is important because a typical commercial airplane experiences temperatures of about −40° F. to about 110° F. Such temperature changes could affect the voltage output of sensor 60 or 61 and circuit board 70. Each heater should draw about 10 watts of power to facilitate connection to the aircraft electrical system.

As shown in FIGS. 2–5, upper and lower tubes 90 and 100 communicate pressure from chamber 110 and orifice 120 to opposite sides 62 and 63 of pressure sensor 60 respectively. The sides 62 and 63 of sensor 60 are provided with nipples 64 and 65 for receiving an end of tubes 90 and 100. Tubes 90 and 100 are flexible and have an inside diameter of about 1/64 inch to facilitate ease of installation and minimize potential clogging. Sensor 61 is similar to sensor 60 except that only one nipple 64 or 65 is provided. This nipple is connected to a single tube 90 or 100, and communicates with a single chamber 110 or orifice 120.

Figure 4:
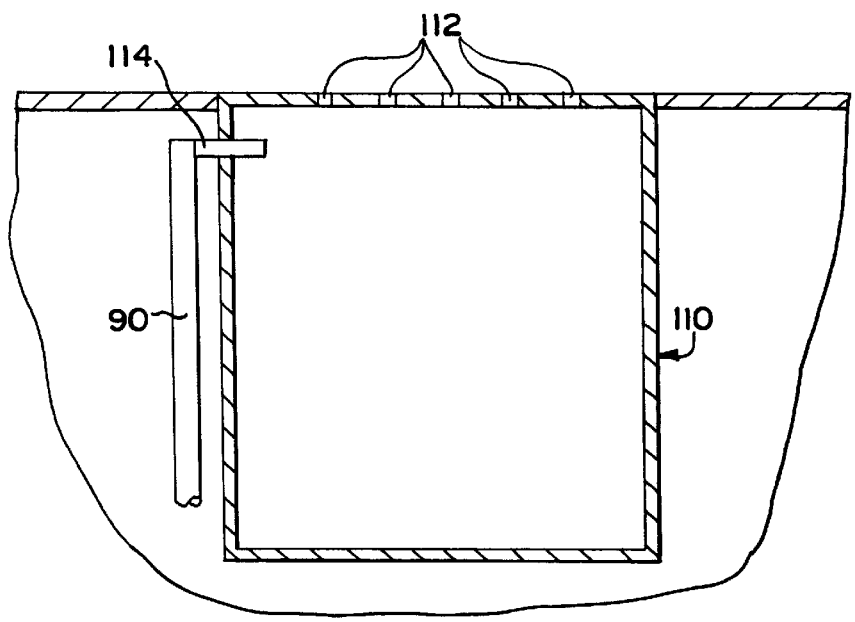
FIG. 4 is an enlarged sectional view of a pressure sensor chamber mounted to an upper lift surface of the aircraft.

As shown in FIG. 4, chamber 110 is mounted flush with upper lift surface 12, and does not alter the desired shape of the airfoil. A number of vent holes 112 are laser drilled into a 0.85 inch diameter titanium disk that forms the top of chamber 110. A array of 144 holes 112 expose the inside of chamber 110 to the external pressure acting on upper lift surface 12. Each hole 112 is about 0.001 inch in diameter inhibit water vapor and debris from entering the chamber and clogging the sensor mechanism. A nipple 114 is provided for attaching an end of tube 90 to chamber 110. Chamber 110 may also be heated to facilitate self cleaning.

Figure 5:
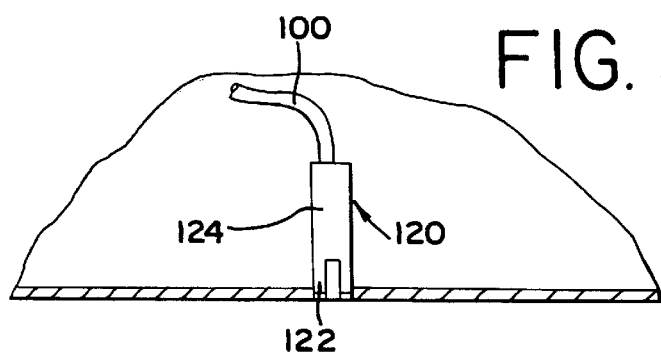
FIG. 5 is an enlarged sectional view of a pressure sensor orifice mounted to a lower lift surface of the aircraft.

As shown in FIG. 5, orifice 120 is mounted to lower lift surface 14, preferably directly below chamber 110. One end 122 of orifice 120 is exposed to the pressure acting on lower lift surface 14. An other end 124 of orifice 120 is adapted to securely receive an end of lower tube 100.

As shown in FIG. 1, lift sensor mechanisms 41–50 are located near the leading edges 2a and 3a of wings 2 and 3. Because a large amount of lift is generated near the leading edges of the wings, a small change in lift can be detected by sensors 41–56. Only the chambers 110 need be located near leading edges 2a and 3a of wings 2 and 3. For a typical airfoil, the best results are achieved when the chambers 110 are located in front of the first pressure spike line of wings 2 and 3. This spike line typically occurs at an apex 15 of upper lift surface 12 for a high percentage wing and more toward the leading edge 2a and 3a for a low percentage wing.

Lift sensors 41–50 measure the actual differential pressure between upper and lower lift surfaces 12 and 14. These sensors 41–50 also monitor a lift pattern being generated across wings 2 and 3. Five sensor mechanisms 41–45 are located on the left wing 2 and five sensor mechanisms 46–50 are located on the right wing 3. Sensing mechanisms 41–45 and 46–50 are preferably spaced equidistantly across wings 2 and 3 respectively. Sensing mechanisms 41–45 of wing 2 can be compared to sensing mechanisms 46–50 of wing 3 to ensure an equal amount of lift is produced by each wing.

Four lift sensing mechanisms 51–54 are also located near the trailing edges 2b and 3b of wings 2 and 3. These sensing mechanisms 51–54 monitor stall. Inner trailing edge sensing mechanisms 52 and 53 should be located approximately 30–35% down the wing from the fuselage, but outside the engine nacelle. Outer trailing edge sensing mechanisms 51 and 54 should be located approximately 60–70% down the wing.

Two lift sensing mechanisms 55 and 56 are located near the leading edges 4a and 5a of tail sections 4 and 5. One sensing mechanism is located on each tail section. The tail sensing mechanisms 55 and 56 monitor lift production of the tail sections 4 and 5 and detect icing or other contaminants effecting these lift surfaces. Tail leading edge sensors 55 and 56 can also be used in combination with wing leading edge sensors 41–50 to monitor for-to-aft lift distribution. A crew can use this for-to-aft lift information to make appropriate adjustments and maximize flight performance.

Pressure sensing mechanisms 141–156 are located in the middle portion of wings 2 and 3. Sensing mechanisms 141–148 measure the pressure acting on the upper wing surfaces 12, and sensing mechanisms 149–156 measure the pressure acting on the lower wing surfaces 14. Four additional sensors 152–156 are also located on the upper and lower surfaces of tail sections 4 and 5.

Pressure sensors 141–156 can be used to compare the pressures acting on one surface of the aircraft with the pressures acting on another surface. For example, the pressures acting on the lower surface 14 of wing 2 can be compared to the lower surface of wing 3 or the lower surface of tail 4 to ensure proper wing balance and for-to-aft balance is being attained respectively. Pressure sensing mechanisms 141–156 can be particularly useful in balancing the aircraft to accommodate for cross winds. These sensing mechanisms 141–156 can also be used to detect unusual pressures acting on the surface of the aircraft, such as those produced by updrafts, downdrafts, wind shears and microbursts.

Figure 6:
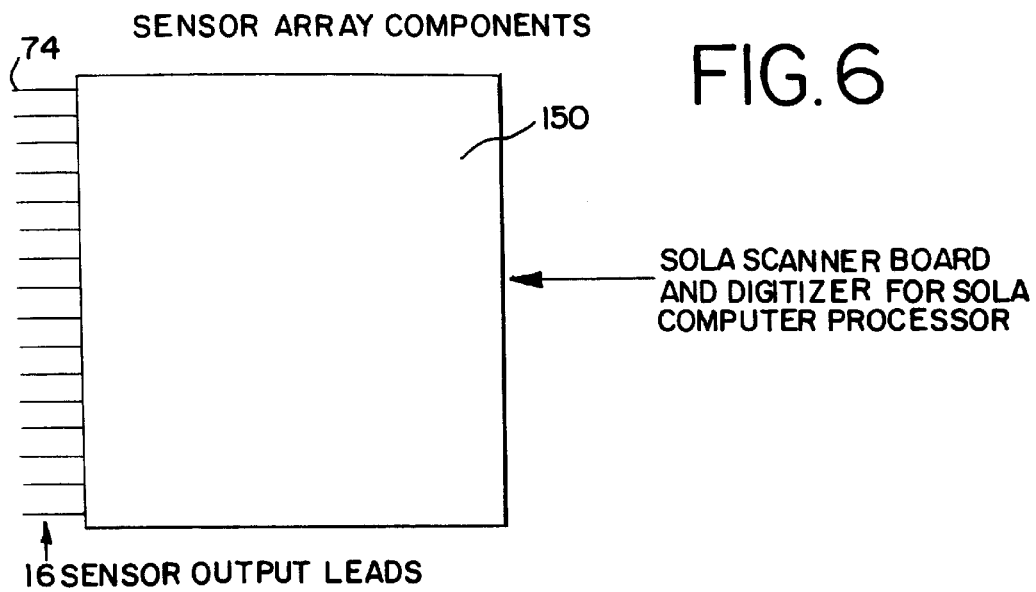
FIG. 6 is a diagram showing sixteen sensor output leads connected to a digitizer.

As shown in FIG. 6, the positive output lead 74 of each lift sensor mechanism 41–56 is connected to a digitizer board 150. The positive output lead 74 of each pressure sensor mechanism 141–164 may be connected to the same or a separate digitizer board (not shown). Positive lead 74 transmits an analog voltage signal produced by sensor 60 or 61 and circuit board 70. Digitizer 150 converts the analog signal to a digital output for use by a central processing unit or computer 200. A separate digitizer board (not shown) may also be used for receiving and digitizing airspeed, airfoil and atmospheric condition data. This data must correspond to the real time pressure or lift measurements of voltage output leads 74. The central processing unit 200 can compare the actual pressure or lift measurements of one surface of the aircraft (eg., wing 2) to the actual pressure or lift measurements of another surface of the aircraft (eg., wing 3 or tail section 4) to determine whether balanced flight is being achieved.

Figure 7:
FIG. 7 is a diagram showing data flow from a central processing unit to on-board memory banks.

FIG. 7 shows that the central processing unit 200 communicates with several memory devices 210 and 220. Hypothetical pressure and differential pressure measurements are stored in both of these memory devices 210 and 220. An actual pressure or differential pressure measurement can then be compared with the hypothetical pressure of differential pressure measurement to determine whether proper pressure and lift is being developed for a given the aircraft airspeed and atmospheric conditions.

Every type of aircraft will have its own unique pressure and lift development characteristics. In fact, it is believed that even individual aircraft of the same type do not generate exactly the same actual pressure and lift development data under the same conditions. Consequently, hypothetical data must be gathered by a test plane for each type of aircraft. The test plane is loaded with a System For Onboard Lift Analysis (SOLA) and run through a series of test flights to gather clean wing pressure and differential pressure measurements corresponding to various speeds and other aircraft flight and atmospheric conditions. Abnormal pressure and differential pressure measurements can be produced through wind tunnel tests or mathematical calculation or extrapolation. Hypothetical data is collected during all phases of normal flight, such as taxiing, takeoff, climb, cruise, let down, approach, landing and roll out.

The hypothetical database relates actual pressure and pressure differential measurements to corresponding pressure and lift measurements for similar speed, aircraft and atmospheric conditions. Other relevant aircraft condition data may include flap and slat position, angle of attack, landing gear position, etc. Atmospheric condition data may include altitude, wind speed, wind direction, etc. Some factors may be important to one or more phases of flight but not the others. Of these conditions, aircraft speed is believed to be the most critical to evaluating proper lift development.

Actual pressure and differential pressure measurements are also gathered during all phases of an actual flight. The computer 200 gathers, compares and stores 100 actual pressure or differential pressure measurements every second during critical stages of flight or when an anomaly condition is detected. During noncritical stages of flight actual data is gathered, compared and stored at a slower rate.

Only a certain narrow range of acceptable pressure and differential pressure measurements will be selected. Deviation from the acceptable range of lift production will trigger an instant analysis of the problem which will mathematically define the possible cause of the unacceptable readings. Typically this is a simple matter of division in that all contaminants tested have a unique finger print (i.e., on an 18% thickness to chord ratio wing, a clean wing reading is 100%, type II fluid contamination is 92–95%, rime ice 63–72% clear ice or mixed ice in excess of $1/32$ inch typically falls below 60%) wind related problems such as wind shear, microburst, cross winds, etc. all present equally recognizable variations in sensor to sensor wing to wing only for-to-aft readings as well. Pressure and differential pressure measurements for these recognized abnormal conditions would be stored in one of the two databases or memory devices 210 or 220.

Actual pressure and differential pressure measurements are also used to compile actual optimal pressure and differential pressure measurements for later use. Actual optimal data is. preferably stored in a separate database from the hypothetical optimal data. Actual optimal data is specific to the particular aircraft in which SOLA is installed, and is updated each flight. The computer 200 will use actual optimal data as a primary source of reference for comparing actual pressure data to determine if an abnormal pressure, pressure pattern, lift or lift pattern condition exists.

Figure 8:
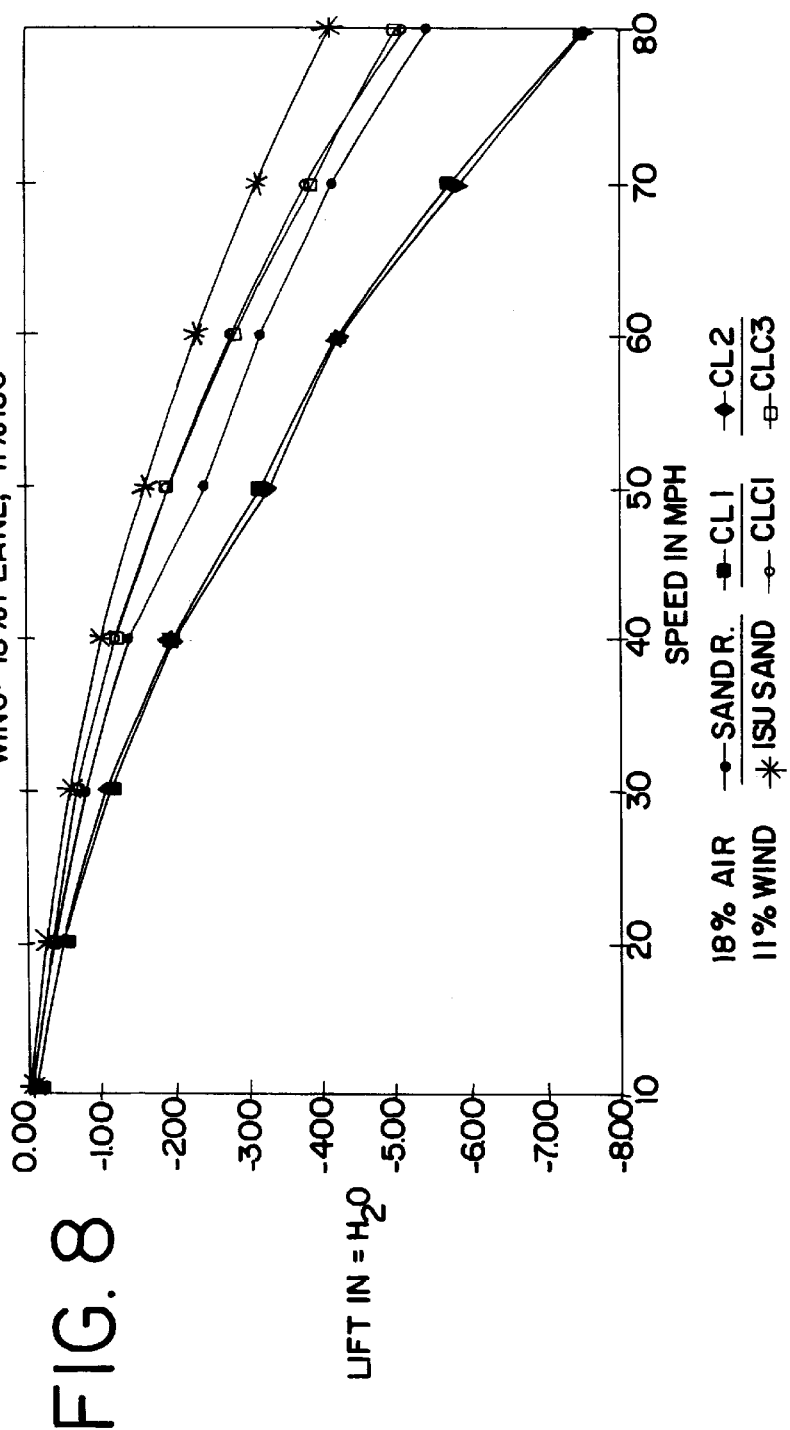
FIG. 8 shows a diagram showing a lift curve of an aircraft during takeoff when the wings are clean, when rime ice is present, when a fluid contaminant is present, and when the leading edge has been roughened by attaching sandpaper to a leading edge of the wing.

FIG. 8 is a graph showing lift development for wind tunnel tests performed on a SOLA equipped aircraft. As can be seen from the graph, SOLA is capable of distinguishing an optimal clean wing pressure differential from anomalous ice, fluid contaminant pressure differentials. As can readily be seen from FIG. 8, distinctions between proper and improper lift development can be made at speeds well under 30 miles per hour. Detection of an anomaly at a low speed is particularly important because it enables a pilot to detect an abnormality while taxiing or to safely abort a takeoff.

Figure 9:
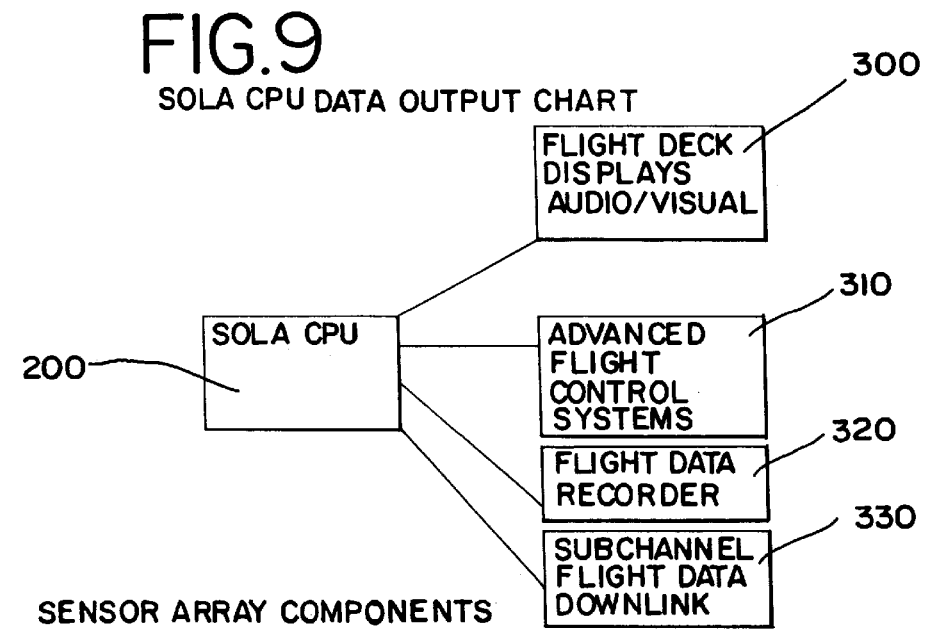
FIG. 9 is a diagram showing data routings after the data is processed by a central processing unit.
Figure 10:
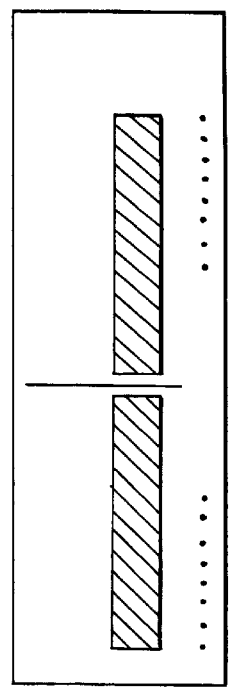
FIG. 10 shows a SOLA screen display of a normal aircraft lift pattern during sustained level flight.

FIG. 9 shows a very basic SOLA output chart. The computer can be linked with several onboard systems, so that pressure and lift development data can be passed on to these systems. A flight deck display 300 monitors lift production visually. An example of a display showing a normal lift pattern during sustained flight is shown in FIG. 10. When an anomaly is detected, the crew will be advised both audibly and visually. In certain instances the crew may be advised of the corrective action that can be taken.

An advanced flight control system (AFCS) 310 will likewise be appraised of the pressure and lift data and any existing anomalies. It is believed that computer programs can be developed to direct the AFCS to react to anomalies as they are detected. This ability to interact should greatly enhance the ability of the aircraft to perform more efficiently and much more safely than previously possible. Reaction times will be measured in milliseconds rather than in seconds during critical situations.

A flight data recorder 320 can likewise be enhanced from a performance standpoint. Additional vital information including low altitude readings can be included as can a myriad of other vital statistical data.

A sub-channel flight downlink 330 can also be connected to the SOLA computer. This will enable a ground crew to monitor flight performance data during flight. It will also enable lift development data to be safely stored in the event of an accident As shown in FIG. 7, vital flight data is stored in both temporary and permanent storage facilities. SOLA preferably has a flash memory device 210 capable of storing 100 megabytes and an optical memory device 220 write or read only memory (WORM) capacity of storing nearly one billion bytes of data. The flash memory device 210 will maintain flight data on a flight by flight basis. The monitoring of the aircraft's performance and any anomalies will be kept on both mediums 210 and 220. An optical drive 220 will act as an auxiliary flight data recorder and will keep only very select data from each flight. However, in the event of a critical anomaly the optical drive 220 and flash memory 210 will keep very detailed analysis of the event. The flash memory 210 will be very flight intensive. The data on the flash memory 210 will normally be erased after each flight cycle and begin to accumulate new data as the next flight cycle begins.

In the event of a dangerous anomaly occurrence, the WORM 220 will keep a highly detailed account of the critical data as well as passing the data on to the above systems 300–330. This permanent stored data can backup the flight data recorder 320 in the event of an emergency situation or an anomaly occurrence. The optical disk medium 220 is not subject to the same ease of data loss as a typical hard drive unit. Electromagnetic forces and shock will not have nearly the effect on the optical unit 220 as they have on a hard disk. The optical drives 220 can provide a great deal of flight data to the airlines and the manufacturers. The optical drives 220 can also be easily removed for study or archival storage, and replaced with a new one in a matter of seconds. Considering all the available performance related inputs available, this particular feature should prove itself to be a very beneficial item when it comes to both maintenance or operational reviewing.

In another embodiment of the present invention a method and apparatus are employed where the air pressure sampling ports are generally arranged in groups of four with three sampling ports on the wing and one reference port within the aircraft. Specifically, FIGS. 11 and 12 show a wing section 400 with a leading-edge sampling port 410, a sampling port 420 on the lower surface of the wing and a sampling port 430 on the upper surface of the wing 410. The ports 420,430 are connected by tubing 530 to opposite sides of a differential pressure sensor, such as sensor 540 of FIG. 16. When a sensor 540 is connected to sampling ports 420,430, a signal is generated which relates directly to lift. A sampling port 440 (not shown) is located within an unpressurized cargo bay of the aircraft to provide a non-turbulent, ambient, static air pressure sample for differential comparison to the air pressure at the leading edge sampling port 410. It should be appreciated that the sampling port is desirably as close as is practical to the leading edge stagnation point of the airfoil. In this way, the sampling port 410 measure experiences total air pressure. The sampling ports 410 and 440 are connected, also by tubing, such as tubing 530 and 530A respectively, to a differential sensor, such as sensor 540, as disclosed in FIG. 16. Thus, the sensor 540 provides an electric signal from electrical connectors 592, 594 relating to the difference between the total air pressure acting on the outer surface of the aircraft and the non-turbulent, ambient, static air pressure. From this signal and the value for the ambient density of the air, the aircraft's speed relative to the air can be determined. Other data may be determined from this measurement, as set forth below.

FIGS. 11–15 disclose the structure of the sampling ports 410–440. Because each of the sampling ports 410–440 differ only in their location on the aircraft, and are identical in structure general reference in the Figures is only by reference number 410 and is generically referenced in the text below where appropriate as 410. In other areas in the text, the reference 410 will refer to the port locations as well.

As can be best seen in FIG. 13–15, sampling ports 410–440 replace existing screws or rivets that are used to attach the aircraft skin 450 to the framework of the aircraft (not shown).

In this embodiment, sampling ports 410–440 are made from an aircraft screw 460 with a head portion 470 and a threaded body 480. The head 470 and body 480 are hollowed out defining a sampling port housing with a sump chamber 490. The head 470 is configured to accept a titanium disc-shaped cover 500 which is laser drilled to have 0.002 inch holes defining a mesh 510. Successful tests have been conducted with meshes of 100 to 250 holes. The mesh permits air to flow into the chamber 490.

Inside the chamber 490 a hollow needle 520 is provided to permit air flow to a tube, such as tube 530, which tube connects the sampling port 410 to a pressure sensor 540 (as best disclosed in FIG. 16). A lower end 525 of the needle 520 inserts into an end 535 of the tube 530. An elastically deformable gland 550 surrounds the tube and needle portions 525 and 535 respectively. When cooperating compression nut 560 is threaded onto the body 480 of screw 460 the gland 550 serves to seal both the chamber 490 including sealing around the needle and tubing portions 525, 535. This latter seal helps to maintain the connection of the tubing 530 to the sampling port 410. The needle 520 has an entrance opening 528 on a side thereof to help prevent fluid or particulate contamination directed in a straight line from the cover 500. The needle entrance is also placed at an upper end of the needle so as to extend above a bottom 529 of sump chamber 490. In this way, the sump chamber can accumulate contaminants without passing them into the entrance 528 of the needle and further contaminating the system.

A jacket nut 570 is threaded on the body 480 of screw 460 to secure the screw 460 into the airfoil surface 450. The jacket nut 570 has an elongate configuration to provide more thread contact. The jacket nut 570 also employs a tapered recess 575 to matingly clamp a periphery 455 of opening 458 in the airfoil skin 450 between the recess 575 and a tapered portion 475 of screw head 470 as best disclosed in FIG. 15. As best disclosed in FIG. 15, the sampling port is substantially flush with the airfoil surface 450. This helps to eliminate drag and turbulence which could affect flight and air pressure measurements. It should also be noted that an extra thickness of airfoil skin 457 can be added to strengthen the sampling port mounting. This doubling can also be accomplished by positioning the port in an area where the aircraft skin is already doubled.

Preferably the jacket nut 570 is wrapped by a low voltage electric heater jacket (not shown). The heater jacket keeps the titanium cover 500 from icing over since it operates at 50 degrees C. In the event, that the entire titanium cover 500 is covered by a contaminant, the trapped residual air pressure within the sampling port 410 usually blows the mesh 510 holes clean as the aircraft gains altitude.

Contamination of the sampling port 410 is deterred and prevented in several ways. First the small diameter (0.002 inch) of the holes in the mesh 510 of port cover 500 itself deters fluid entry based on surface tension of the fluid. Normal takeoff levels of lift and speed sensing do not allow leeching of water or Type II fluids at a rate sufficient to contaminant the inner pickup unit during takeoff roll or ascent to cruise altitude. If any fluid should leech through it is typically evaporated by a combination of its own vapor pressure at reduced atmospheric pressure at a higher altitude, and the heat from the jacket heater (not shown) which keeps the sampling port 410 at about 50 degrees C. It has also been observed that wind and vibration combine to produce a very effective scrubber of the mesh 510.

Although many installation configurations are possible and desired depending on specific data acquisition requirements, FIG. 17 shows at least five groups 580, comprised of sampling ports 410–430 (and reference ports 440 inside the aircraft), on each wing and one group 580 on each side of the horizontal stabilizer as a recommended installation.

Air pressure is transmitted from each of the sampling ports 410–440 through tubing, such as tubes 530 and 530A which are preferably a coated type tubing such as Teflon, to a separate but identical differential air pressure sensor, such as sensor 540. Each sensor 540 comprises a cell 590 and a sensor board (not shown) both of which are housed in a sensor enclosure box 610 (as shown in FIG. 17). The sensor enclosure 610 has an operational temperature range from minus sixty to over one hundred (100) degrees C., and is able to withstand a loading of plus or minus twenty five times the force of gravity ("g"). The enclosure 610 can be located in any protected area in the wing or fuselage. Preferably they are located centrally in the fuselage.

Electronic signals are sent from the sensor cell 590 to the sensor board (not shown) and from the sensor board electrical signals are sent to a computer (not shown). A central processing unit of the computer has a 486 processor with a two hundred megabyte hard disk drive and operating speed of fifty megahertz. The power supply is configured to meet all FM and ICAO requirements and has an optional one hour battery pack. For use in data acquisition there is an optional eight hundred megabyte optical drive.

Information can be displayed or used in several ways. The pilot can monitor the system output on an existing EFIS tube, an existing flight management system display or a color liquid crystal display can be supplied to display the system data, or a warning board 611, such as shown in FIG. 18. Information from the sensor board also be integrated into the stall warning system, the de-ice/anti-ice systems, and the automatic flight control systems.

Preferably, the system is used before the takeoff roll by taking actual pressure readings on the wing and tail surfaces to determine if there are any lift-robbing wing contaminants such as ice or type II fluids. By comparing clean wing data to contaminated wing data, any contaminant that collects on the wings is detectable by the system as a percentage of "lift loss." Ice, frost, or Type II fluids generate their own distinct pressure footprint which is distinguishable by the system. When a predetermined "Lift Loss" threshold has been met, the flight crew is issued an advisory.

EXAMPLE I

A wing section was mounted on a road test vehicle (now shown). Two sets of sampling ports 580 were mounted in the test wing (not shown), approximately thirty inches apart.

Figure 20:
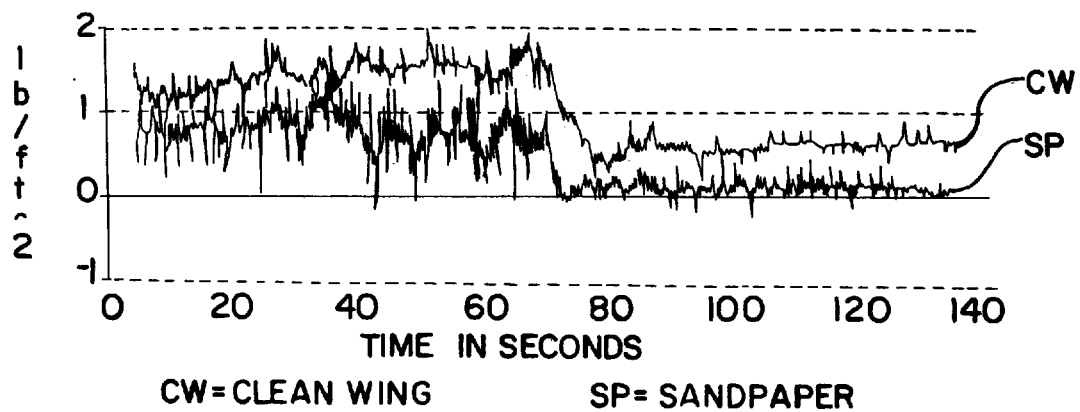
FIG. 20 is a graph entitled "Lift Effect Due To Simulated Frost-Ground Test," disclosing data and data formats according to an aspect of the invention.

The test vehicle was driven at thirty miles per hour (30 mph) and then decelerated to twenty miles per hour (20 mph). The system output is shown at FIG. 20. The graph is a plot of real-time versus measurements of the pressure differentials of the SOLA ports, in pounds per square foot. The line labeled SP indicates the section contaminated with a four inch by eight inch (4"×8") section of one hundred (100) grit sandpaper. It is noted that, leading-edge applications of 100 grit sandpaper are used in the industry to represent the effects of one thirty second of an inch (1/32") of rime ice build up. The line labeled CW illustrates the results for the clean airfoil. The wind on the test day was negligible. The speeds are vehicle speeds, not airspeeds.

EXAMPLE II

Figure 19:
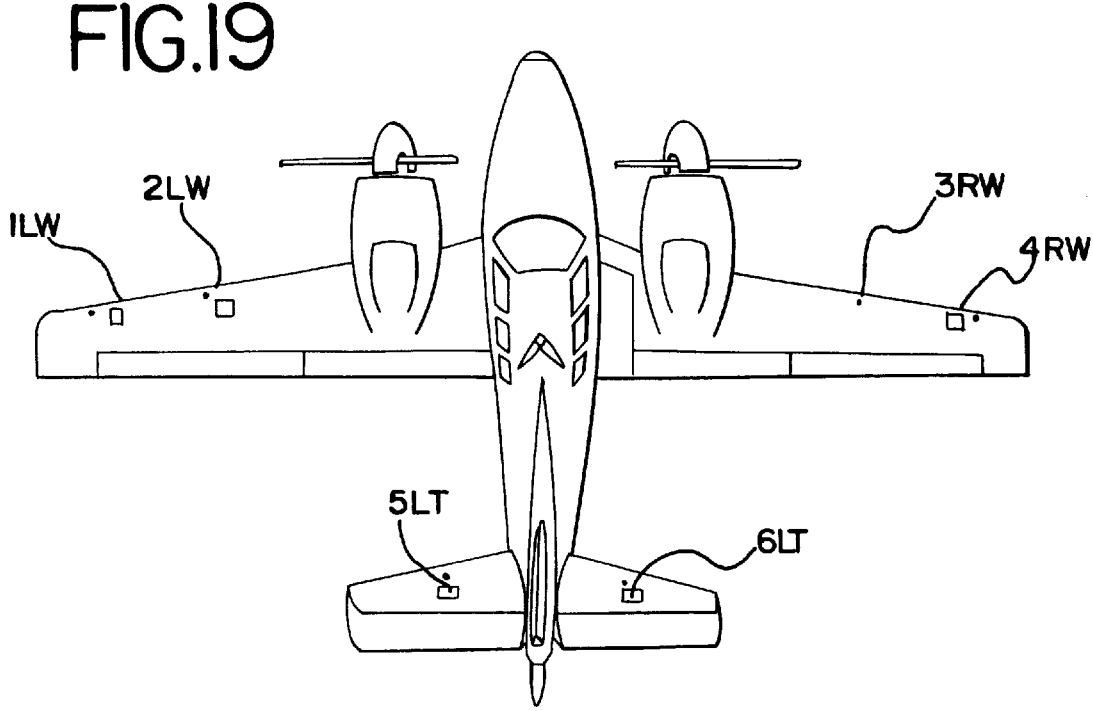
FIG. 19 is a top view of a Beech Craft Baron embodying air pressure-measuring devices, according to the invention.

A Beech Craft Baron (BE-95 C55) was equipped with six groups, identical to group 580, as shown in FIG. 19. FIGS. 20–38 disclose graphs produced to demonstrate some of the data acquisition capabilities and the sensitivity of the system. Normal flight maneuvers were flown to generate these graphs. FIGS. 22, 24, 26, 28, 30, 32, 34, 36, and 38 are plots of real-time versus pounds per square foot of pressure differential between upper and lower ports. FIGS. 21, 23, 25, 27, 29, 31, 33, 35, and 37 are plots of real-time versus system reference speed. The graph lines are generally labeled 1–6 and as LW and RW for left and right wings and LT and RT for left and right tail, respectively.

To fully understand these Graphs 21–38 and better appreciate the type of information that can be developed, a brief discussion on the aerodynamics of this model of Beech Craft Baron (FIG. 19) is appropriate. For instance, the lift produced on the outboard left and right wings positions 1LW and 4RW are not equal on the graphs. This is due to the manufacturers design.

The test aircraft's wings are designed to stall at the wing root trailing edge first. The geometric angle of incidence or wing twist has been adjusted by the manufacturer to give the pilot better low speed controllability. The angle of attack at the wing root is slightly greater than the wing tip. The data indicates a greater amount of lift at sampling port group 580 locations 2LW and 3RW. Also, group port 580 positions 2LW and 3RW are located in an area with a longer chord and thicker wing sections than those near the wing tips. This difference in lift can be seen throughout the graphs showing lift. During takeoff and landings, these readings appear to be exaggerated because of variances in angle of attack.

On this aircraft, the descending blade is on the right side of both engines, the propellers are not counter-rotating. This is aerodynamically significant as evidenced by the measurements and data acquired by the system. The descending blade of the propeller normally produces more thrust than the ascending blade. This causes the aircraft to attempt to turn left during high power settings at low airspeeds. The pilot counters this force by applying right rudder.

The manufacturer also designs the aircraft to balance these forces. The aft main wing has a built-in angle of incidence or wing twist to produce a slightly greater amount of lift force on that side. The graphs reflect this difference between the wings. The horizontal stabilizer is also designed to counter the propeller forces.

The effects of the controls, airspeed, angle of attack, configuration, and aerodynamic environment can easily be determined, as shown by the graphs. Many of the fluctuations in speed and lift seen in the graphs are caused by the aircraft seeking a point of equilibrium. Other fluctuations are due to ground effect, turbulence, or pilot control input.

FIGS. 21 and 22 illustrate the data obtained during a takeoff. The brakes were held while full power was applied to both engines for 45 seconds. First, acceleration of the air stream over the left and right horizontal stabilizers (5LT and 6RT) is detected. The brakes were then released and a gradual increase in system reference speed on all four sampling ports 410 is seen on the wings at around 50–63 seconds. As the pilot rotated the aircraft into a climb attitude, the speed readings on the port 2LW and 3RW dropped into a negative system reference speed, seen at about 62–64 seconds.

Until approximately the 60 second mark, a steady increase in all of the lift readings is detected. The angle of attack is then increased by the pilot to rotate the nose of the aircraft into the climb attitude. This can be seen graphically as dramatic increase in the lift readings. A general decrease in all the lift readings occurs as the aircraft climbs out of ground effect at about 65–68 seconds. The horizontal stabilizer lift readings reverse at the 67 second reference point. This is indicative of the right rudder input by the pilot to counter the left turning tendencies of this aircraft during a stabilized climb.

Figure 23:
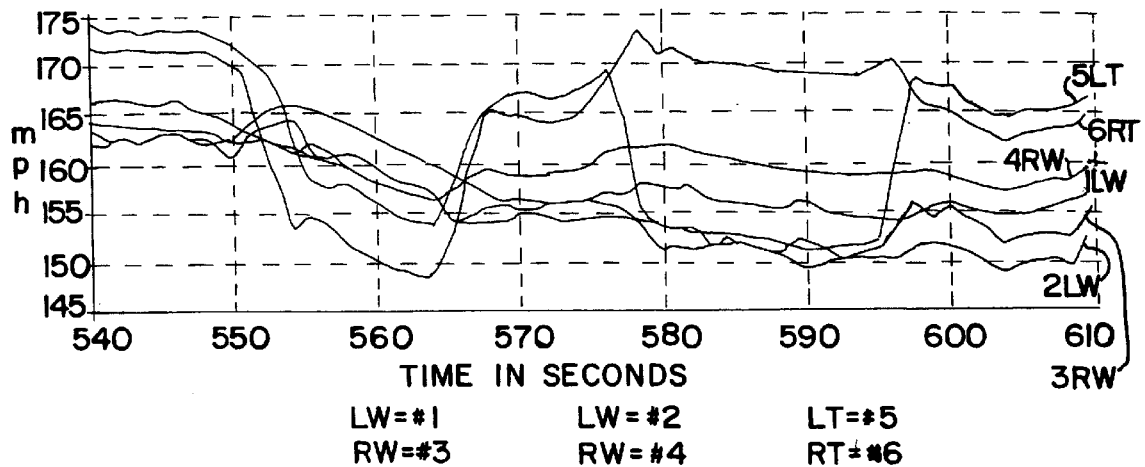
FIG. 23 is a graph entitled "Flight Test-System Reference Speeds," disclosing data and data formats according to an aspect of the invention.
Figure 24:
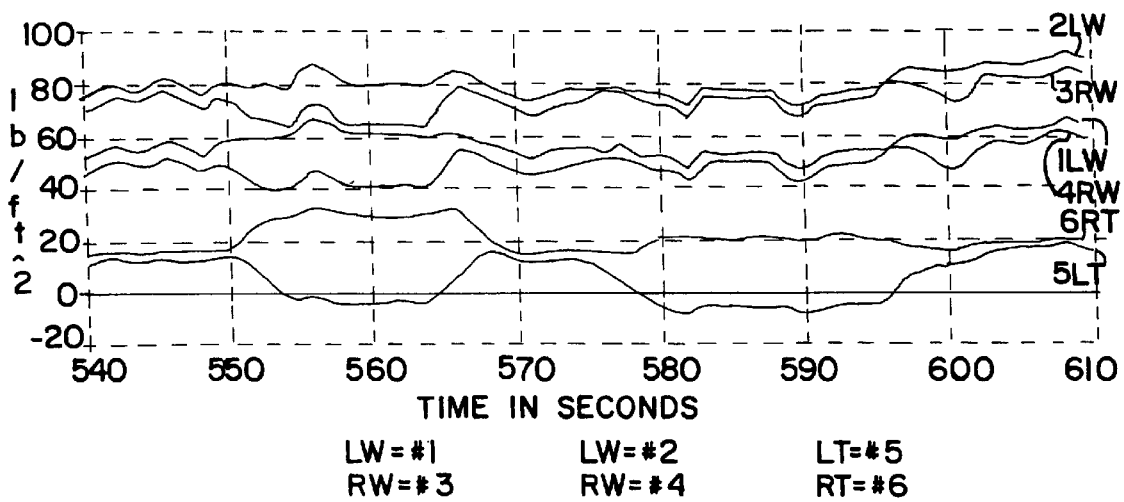
FIG. 24 is a graph entitled "Flight Test-Local Lift," disclosing data and data formats according to an aspect of the invention.

FIGS. 23 and 24 show an aileron and rudder cross control maneuver which simulates the forward slip procedure used for cross wind takeoff and landings. First, the pilot applied left ailerons, rolling the aircraft into a left bank. At the same time, right rudder was applied to inhibit the aircraft nose from changing direction at about 550–570 seconds. This placed the aircraft in an out-of-trim condition that is expected to cause an excessive amount of drag. This was detected by the general decrease in all of the system reference speeds as the maneuver is flown. The measurements show the two reference speeds on the horizontal stabilizer drop below the wing reference speeds as the out-of-trim condition worsens. As the pilot neutralizes the controls, the speeds all return to normal.

Next, right aileron is applied with left rudder (at about 575–600 seconds). Again, a general decrease in all reference speeds with the exception of the right horizontal stabilizer is detected. This is due to the built-in precluding of the test aircraft's tail.

The lift readings on the main wing crossover and back as the aircraft is banked left and right. Comparing the lift readings on the horizontal stabilizer, the pilot applies right rudder, the lift readings reverse and the differential margin of lift production increases. When the pilot applies left rudder, the differential margin of lift production increases. Again, due to the test aircraft's precluded tail, a crossover of lift does not occur at this point.

Figure 25:
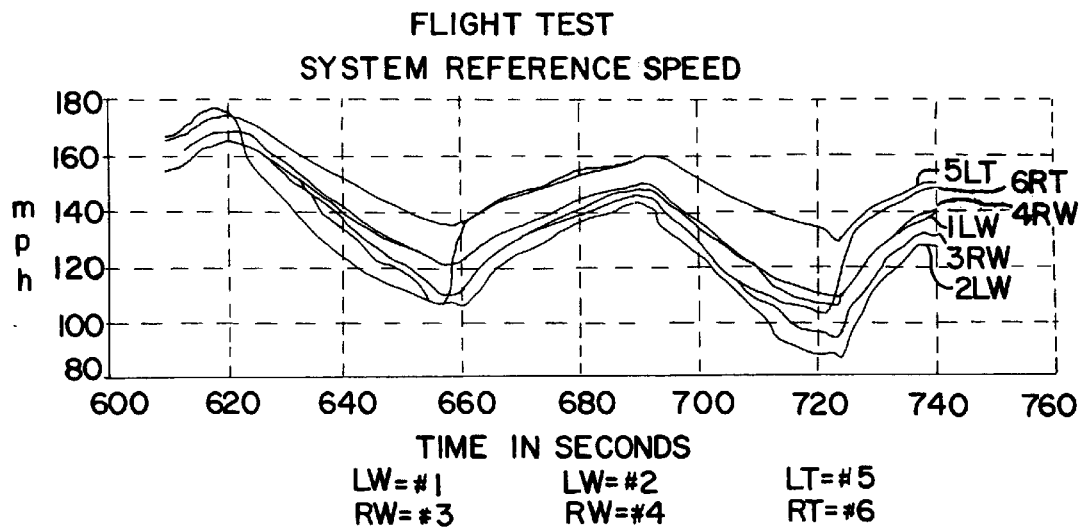
FIG. 25 is a graph entitled "Flight Test-System Reference Speeds," disclosing data and data formats according to an aspect of the invention.
Figure 26:
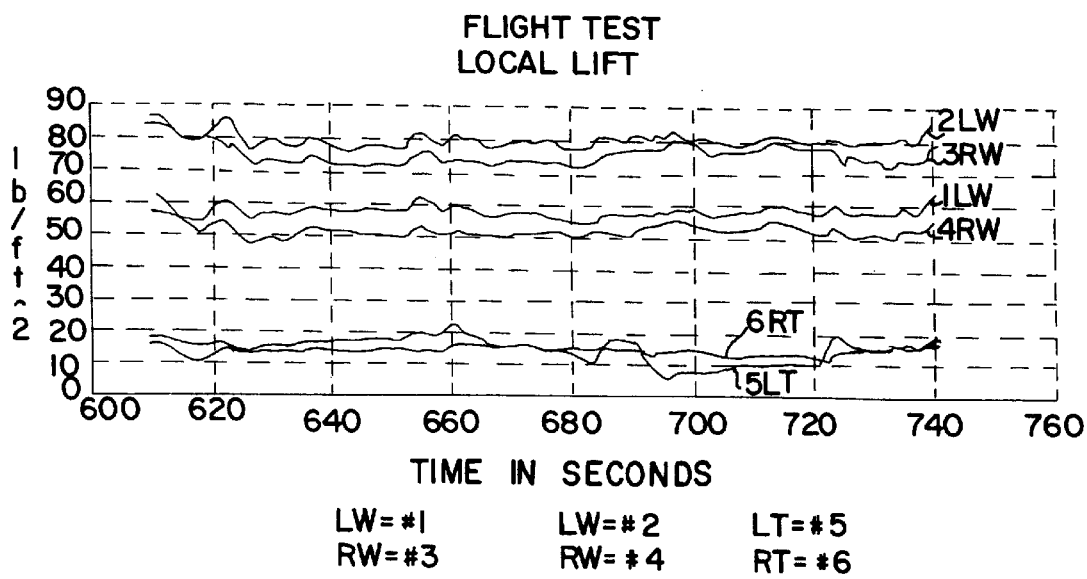
FIG. 26 is a graph entitled "Flight Test-Local List," disclosing data and data formats according to an aspect of the invention.

FIGS. 25 and 26 disclose graphs of left and right engine power reductions to idle maneuvers. The engines were throttled back individually to simulate an engine failure. Due to the location of the tail ASDIS ports, the airflow from the propeller normally produces horizontal stabilizer system reference speed readings that are 10–15 mph faster than the reference speeds on the wing.

As the pilot reduces power on the left engine to flight idle, the left tail system reference speed is shown to transition from 175 mph to 150 mph ~620 660 seconds). Initially, as the engine decelerates, the propeller moves to flat pitch and causes an excessive amount of drag. The pilot must contend with the cumulative effects of a fifty percent loss in available power, a dramatic rise in drag until the propeller is feathered, and increased drag caused by the flight controls during the effort to maintain control of the aircraft. The system reference speeds all begin to decrease. As the pilot re-applies the power on the left engine, the left horizontal stabilizer reference speed returns to normal (5LT). The pilot then reduces the power on the right engine to flight idle and the maneuver is repeated (690 730 seconds).

The lift on the wings also transitions as the pilot banks the aircraft right and left in the effort to maintain directional control during engine power reductions. The lift on the horizontal stabilizer also transitions, with the directional control rudder applications.

Figure 27:
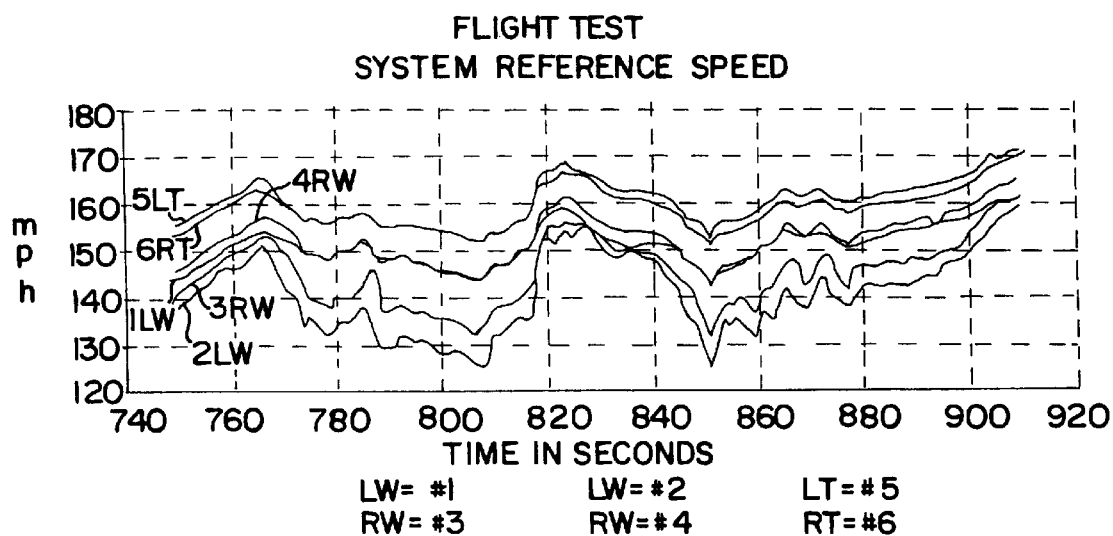
FIG. 27 is a graph entitled "Flight Test-System Reference Speed," disclosing data and data formats according to an aspect of the invention.
Figure 28:
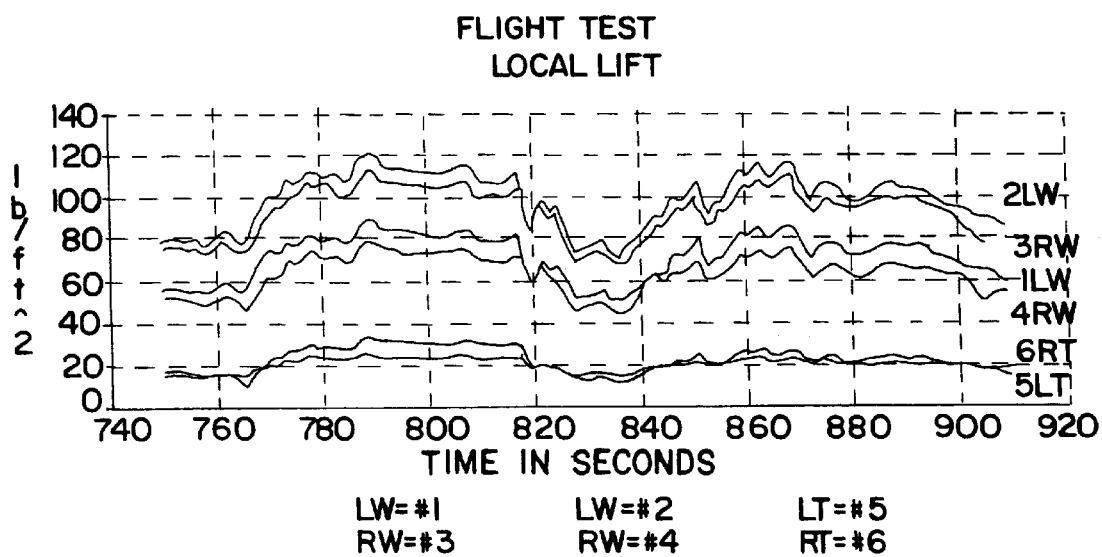
FIG. 28 is a graph entitled "Flight Test-Local Lift," disclosing data and data formats according to an aspect of the invention.

FIGS. 27 and 28 disclose the graphs of data taken during a left and right forty five degree, steep-bank turn. First, the pilot rolled the aircraft into a left forty five degree steep-banked turn detected about 770–815 seconds. At this point, the pilot must pitch the nose of the aircraft up to maintain altitude. The graphs show, the decrease in all the speeds while the turn is in progress. The system then indicates that, all of the speeds then return to normal as the pilot rolls the wings level. A right forty five degree banked turn is then flown as detected at about 840–880 seconds. Again all the speeds are detected as decreasing during the turn.

As shown by the graphs, all of the lift readings increase during the turns. The aircraft experiences additional legal loading as the pilot pitches up the aircraft to maintain altitude. The data can then be used to calculate the "g" loading which in this case is calculated at 1.35 "g."

Figure 29:
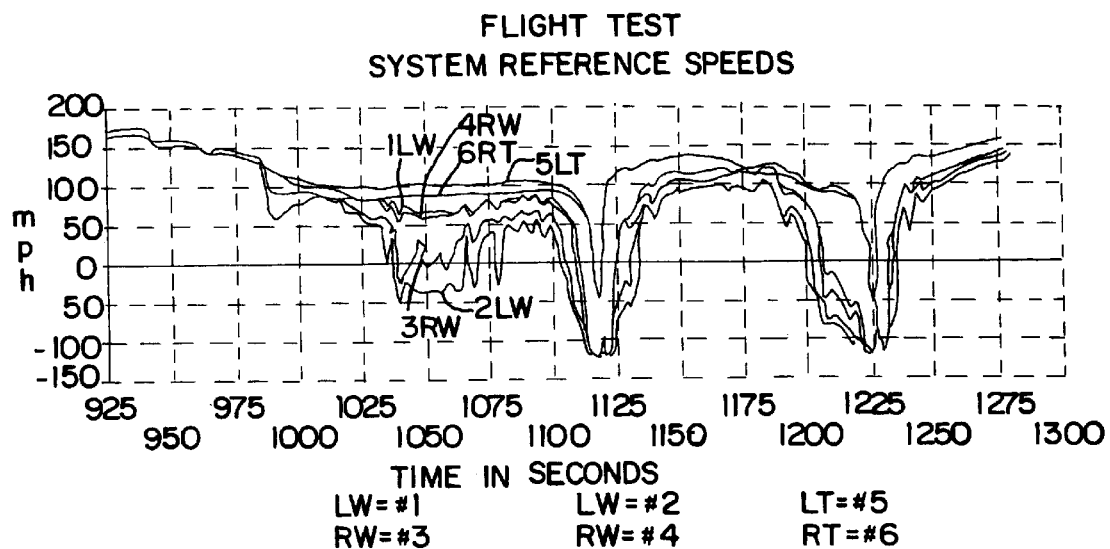
FIG. 29 is a graph entitled "Flight Test-System Reference Speeds," disclosing data and data formats according to an aspect of the invention.
Figure 30:
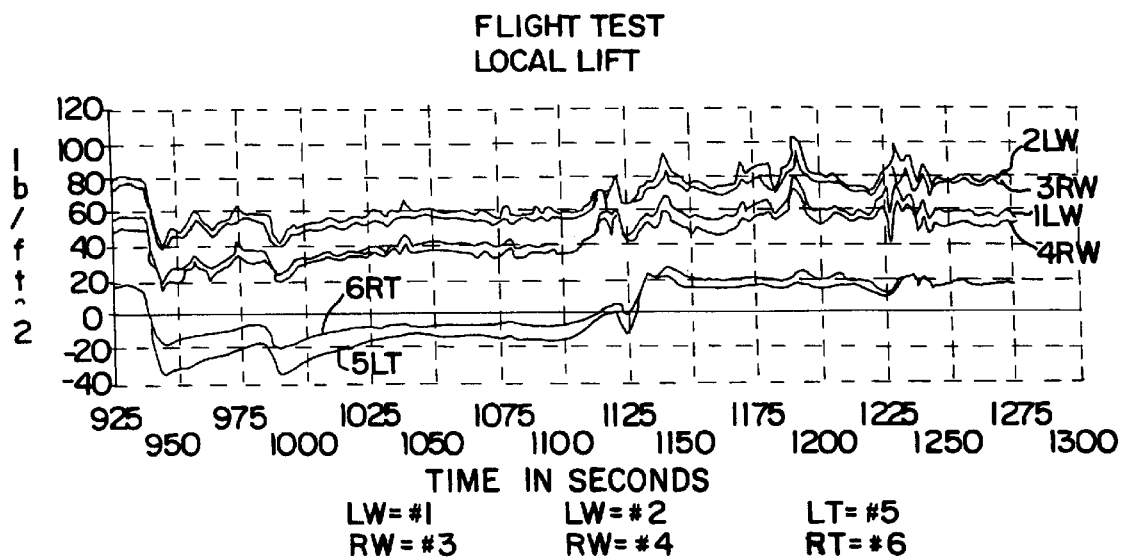
FIG. 30 is a graph entitled "Flight Test-Local Lift," disclosing data and data formats according to an aspect of the invention.

FIGS. 29 and 30 disclose the graphs generated through measurements during slow flight, power off stall, flaps down and up, and gear down and up maneuvers. The flaps and landing gear were selected down and the aircraft stabilized in slow flight at 85 mph., indicated air speed ("IAS") as detected at about 937–1025 seconds. The speed readings on leading edge sample port 410 position 2LW and 3RW is detected moving into negative speed values at about 1035–1100 seconds.

At 1100 seconds, the power is reduced to idle and an aerodynamic power-off stall is executed with the gear and flaps down as detected by the system. The pilot then repeated the stall, with the landing gear and flaps in the up position as detected at about 1200–1250 seconds. At high angles of attack, air accelerates over the leading edge ports and creates a low pressure area. Again, graphically, the corresponding system reference speed is indicated as negative speed values. It should also be noted that during minimum controllable airspeed conditions, the wing tips and horizontal stabilizer are operating at normal system reference speeds.

The system has the ability to tell the pilot how close the aircraft is to stall and when controllability is about to be lost. Graphically, system airspeed at 2LW and 3RW dump first. The aircraft is in low-speed flight and completely controllable. As 1LW and 4RW dump, the aircraft is still flying, although it is on the edge of controllability. When the horizontal stabilizer system reference speeds 5LT and 6RT dump, the aircraft is completely stalled and controllability has been sacrificed.

As can be seen by the data, the system can provide detailed and accurate real-time detection of the onset of a stall condition. Because the turbulence and attendant lift-loss leading to stall, begins at the trailing edge of the wing and progresses forward to the leading edge, it will be understood by those with skill in the art that the more pairs of SOLA ports along the chord or width of the wing as desired for more discrete points of stall can be determined. In other words, the added sensors will give a finer increment of detection. However, it will also be understood that, based upon the known aircraft design, fewer ports are needed because the wing portions where stall most likely is predictable.

Figure 31:
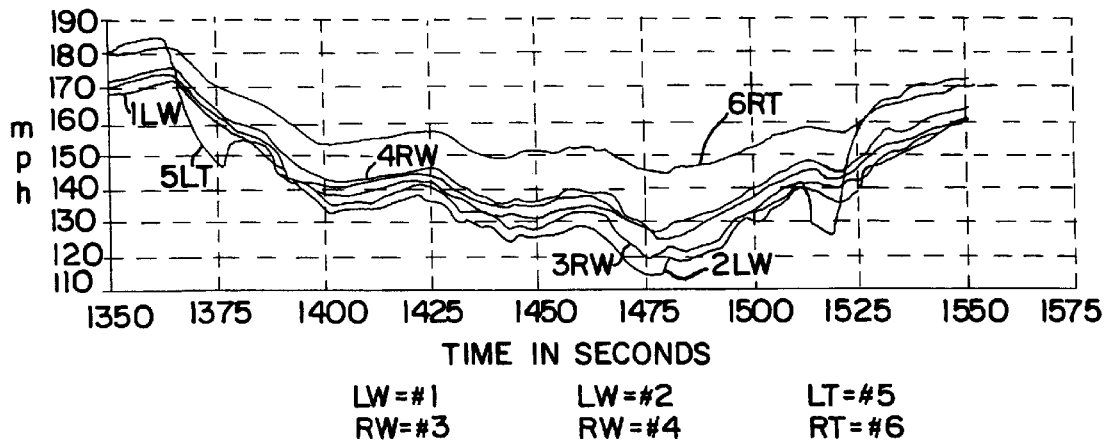
FIG. 31 is a graph entitled "Flight Test-System Reference Speeds," disclosing data and data formats according to an aspect of the invention.
Figure 32:
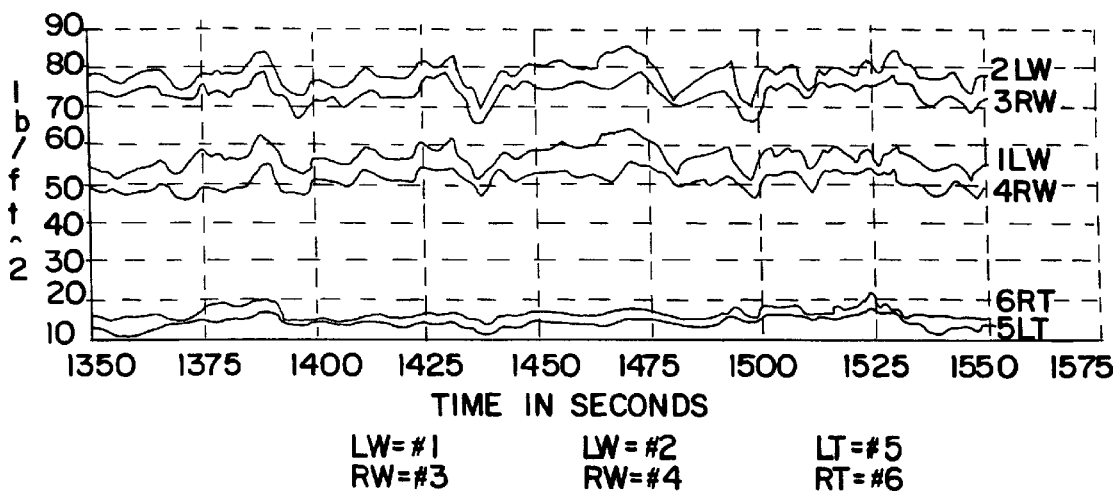
FIG. 32 is a graph entitled "Flight Test-Local Lift," disclosing data and data formats according to an aspect of the invention.

FIGS. 31 and 32 disclose the data from measurements taken during a left engine shut down and feather maneuver. The pilot reduced the left engine power to flight idle at 1360 seconds into the flight as detected by the system. Propeller drag increased and the left horizontal stabilizer reference speed decreases below the wing reference speeds. The engine was then shut down and the propeller feathered (1380 seconds). The power reduction and drag increase causes the speed to decrease from 175 mph to 150 mph.

The left engine was restarted and stabilized at flight idle at 1520 seconds. The power on the left engine was then increased to full power (1525 seconds). As the pilot applies right rudder to maintain directional control, transitions are seen in lift that occur on the horizontal stabilizer sampling ports 420,430 readings during engine shut down and restart as shown at 5LT and 6RT on the graph.

Figure 33:
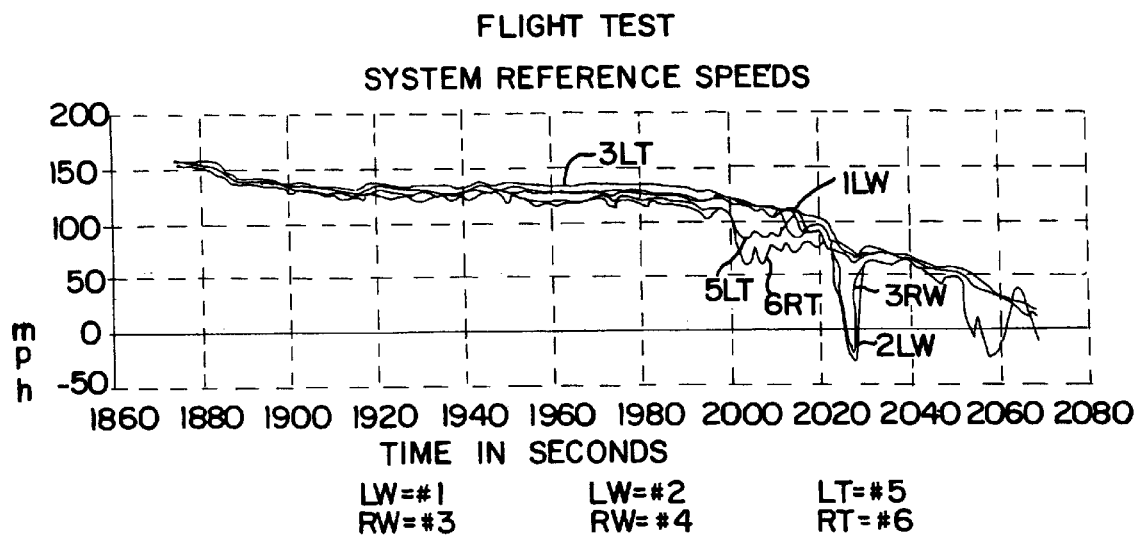
FIG. 33 is a graph entitled "Flight Test-System Reference Speeds," disclosing data and data formats according to an aspect of the invention.
Figure 34:
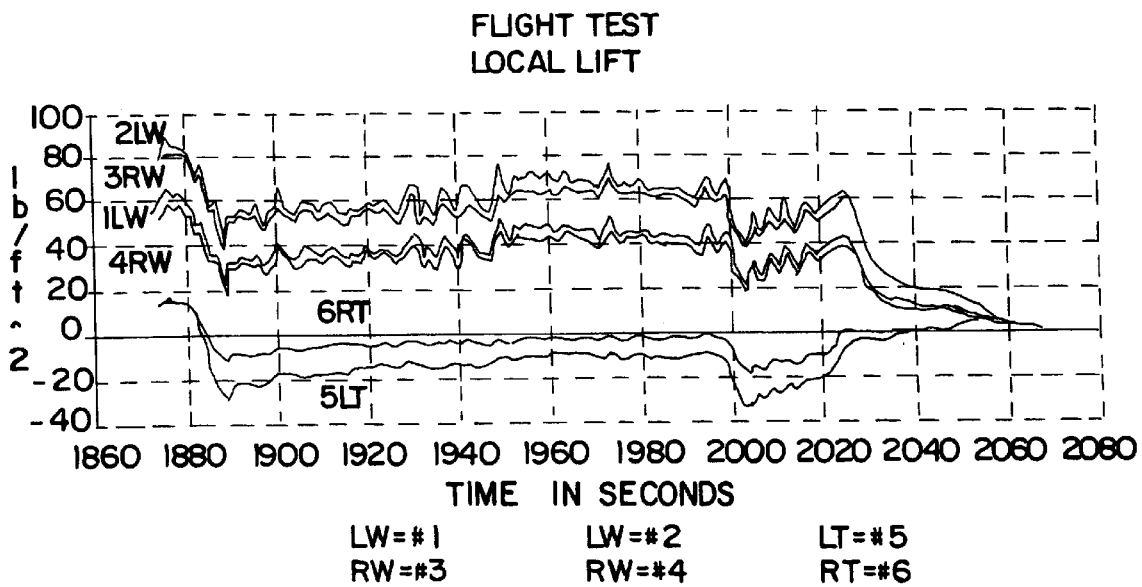
FIG. 34 is a graph entitled "Flight Test-Local Lift," disclosing data and data formats according to an aspect of the invention.

FIGS. 33 and 34 are graphs generated from data collected on a normal approach and landing profile. At 1885 seconds, the flaps were selected to the 15 degree down position. This can be clearly seen on the chart. The landing gear was then selected down at 1920 seconds and full flaps were selected at 2000 seconds. Power reduction to flight idle occurred at 2020 seconds. Ground effect was encountered at approximately 50 feet above ground level (AGL) and can be discerned on the liftchart between 2000 and 2020 seconds.

Again, the leading edge sample port 410 speeds on ports 2LW and 3RW become negative during landing flair (2025 seconds). This change in the sign of the speed is due to the position of the ports 410. When the aircraft is at high angle of attack, air flows across the port instead of flowing into it. This causes a low pressure area at the port 410. The system software interprets this low pressure as a "negative" speed.

Figure 35:
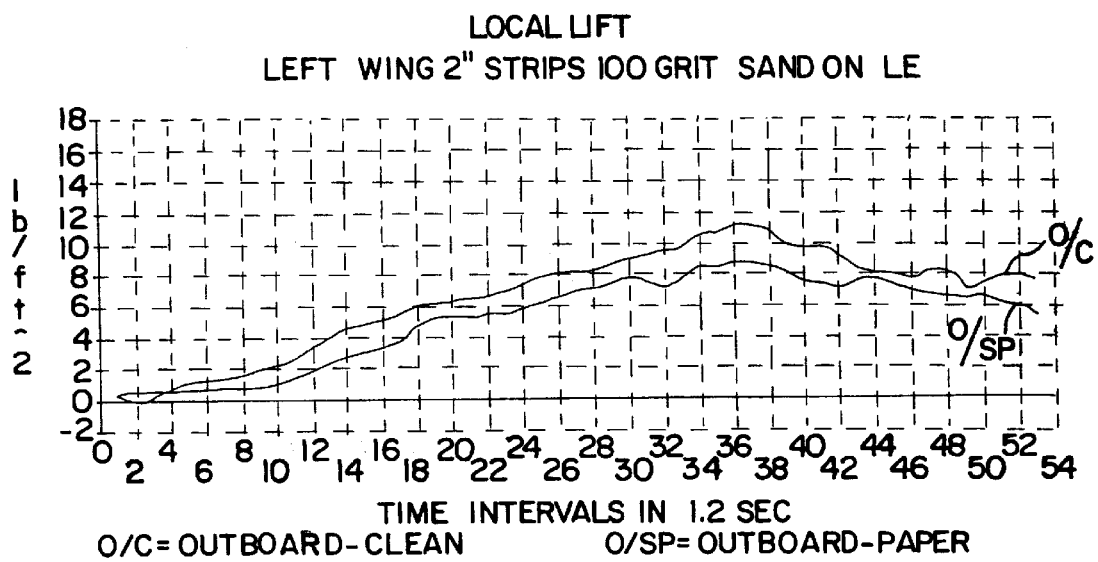
FIG. 35 is a graph entitled "Local Lift-Left Wing 2" Strips 100 Grit Sand on LE," disclosing data and data formats according to an aspect of the invention.
Figure 36:
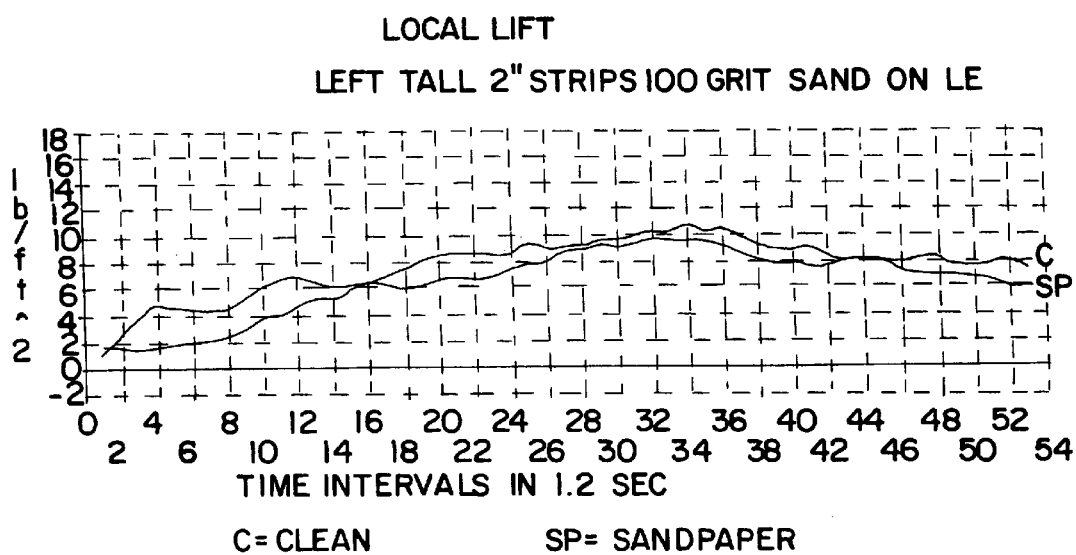
FIG. 36 is a graph entitled "Local Lift-Left Tail 2" Strips 100 Grit Sand on LE," disclosing data and data formats according to an aspect of the invention.
Figure 37:
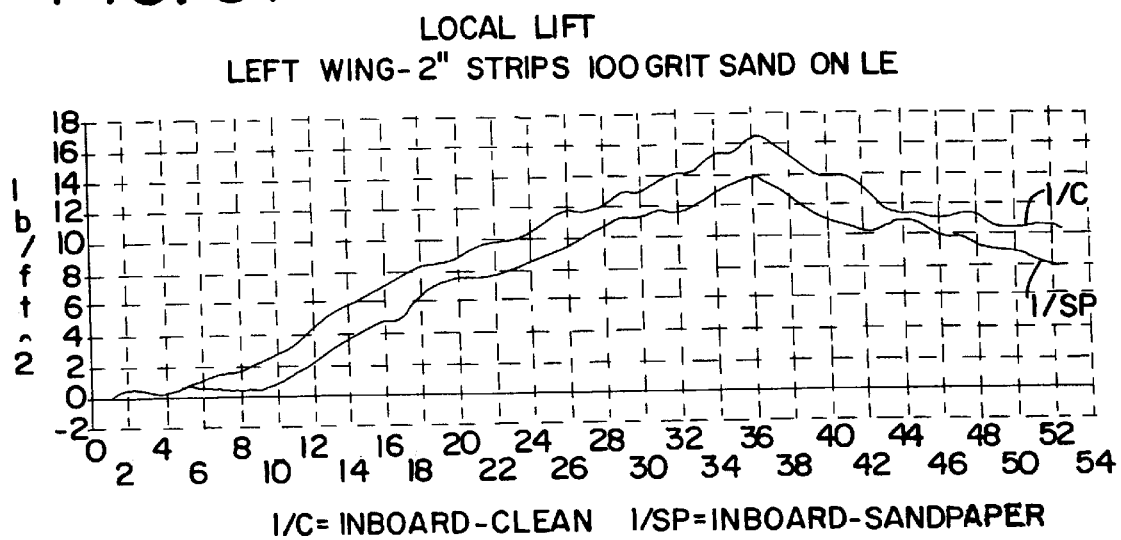
FIG. 37 is a graph entitled "Local Lift-Left Wing 2" Strips 100 Grit Sand on LE," disclosing data and data formats according to an aspect of the invention.

FIGS. 35, 36, and 37 disclose the data measured on two accelerate-stop taxi maneuvers with clean wing versus contaminated wings. These graphs detect and record data from an acceleration to 60 mph followed by closing the throttle and braking to a full stop. Data collection ceased upon brake application. The first run, indicated by the line labeled C, was conducted with a clean wing. The second run, indicated by the line labeled SP, was made with the airfoil leading edge contaminated with two-inch wide strips of 100 grit sandpaper to simulate an accumulation of frost.

Due to the application of the simulated frost on the leading edges, the local lift readings indicated losses of approximately 15–18 percent. The sandpaper strip application covered 15 percent of the wing span. The strips were placed on the wing and horizontal stabilizer surfaces at locations inboard and outboard of the ASDIS ports.

Figure 38:
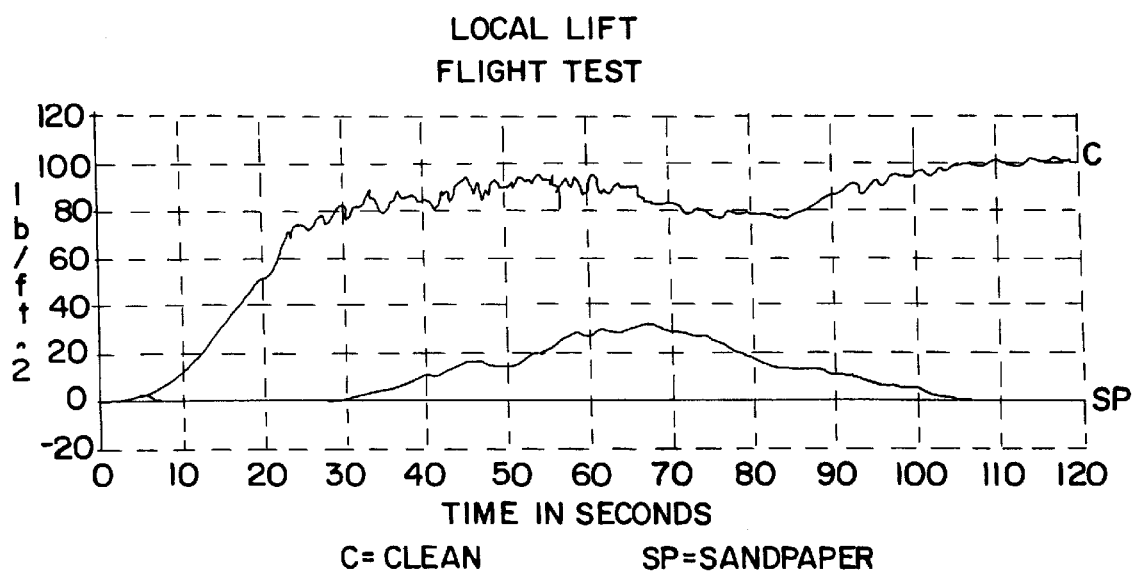
FIG. 38 is a graph entitled "Local Lift-Flight Test," disclosing data and data formats according to an aspect of the invention.

FIG. 38 discloses data taken from comparative ground rolls. This demonstrates the ability of the system to indicate at an early stage during the ground roll that the wing may not generate necessary lift levels when contaminated. The red line represents SOIA measured lift levels during a takeoff executed right the wing free of contaminants. The graph line labeled C displays the results obtained with sandpaper contamination applied to the right wing. The rotation speed on the aircraft is typically 100 mph. The contaminated wing was accelerated to 80 mph (at 65 sec on this plot) and takeoff was then aborted. This same speed was reached for the clean wing case at approximately 20 sec on this plot. It can be clearly seen that there existed a large lift degradation for the contaminated case (about 50%) at the close to-rotation speed attained. Moreover, the system would have indicated large lift losses due to the contaminant early in the ground roll.

It should be appreciated that not all facets of the system's capabilities are detailed in the forgoing exemplary embodiments. For example, the data generated and displayed in the graphs can form the basis for performance templates for comparison with subsequent flight templates. Such templates can be stored and compared as a function of time, speed, flight maneuver or other desired criteria. The data may also be used to derive other desired aerodynamic data for monitoring and controlling flight.

For example, the above described methods and apparatus can also provide a unique testing format which allows tests to be conducted in a real world environment in which wing sections are temperature controlled and run through test sequences outdoors in a manner that closely approximates those encountered by today's aircraft, which land with super-cooled fuel on-board into a variety of temperature and humidity conditions.

While the specific embodiments have been illustrated and described, numerous modifications come to mind without significantly departing from the spirit of the invention and the scope of protection is only limited by the scope of the accompanying Claims.

For example, it is believed that the invention, operating through the Advanced Flight Management and Control Systems, can detect and analyze the impact of a wind shear as it occurs and then operating through the AFMCS ameliorate the shears impact safely, averting the potential for disastrous incidents.

I claim:

1. Apparatus for measuring air pressure acting on a surface of an aircraft during operation comprising:
    a port in a skin of the aircraft;
    a cover positioned over the port, the cover having a plurality of small openings, the openings each sized large enough to permit air flow but small enough to deter water and Type II fluids from passing through the openings;
    a sensing means for sensing a pressure and providing a signal related to the pressure;
    a port connecting means for connecting the port to the means for sensing so that an air pressure acting on the port is substantially communicated to the means for sensing a pressure; and
    a housing with a sump chamber for collecting contaminants which enter through the port, the housing having an open end connected to the port in sealing relation therewith and permitting air flow into the sump chamber, an air outlet in the sump chamber, the air outlet connecting the sump chamber to the port connecting means and the air outlet being positioned in the sump chamber such that contaminants from the air entering the port are trapped by the sump chamber while air pressure can still be communicated from the port through the outlet.

2. The apparatus of claim 1 including a means for heating the port cover.

3. The apparatus of claim 1 including a means to remove liquid contaminates from the sump chamber.

4. The apparatus of claim 3, including a means to heat the fluids in the sump chamber.

5. The apparatus of claim 1, further including a means for receiving the signal from the sensing means and for processing and communicating information relating to the pressure measurements optionally to the flight crew or to other flight control and monitoring equipment or both.

6. Apparatus for measuring air pressure acting on the surface of an aircraft during operation comprising:
    a port in a skin of the aircraft;
    a housing having an internal chamber in communication with a first opening and a second opening, the first opening positioned at the port;
    a hollow needle positioned within the housing adjacent the first opening, the needle having a first end and a second end, the needle having a side opening adjacent the first end;
    a tube having a first end and a second end, the first end extending through the housing second opening and being connected to the second end of the needle;
    a pressure sensor connected to the second end of the tube; and
    an elastic member positioned around the first end of the tube at the second opening of the housing to seal the internal chamber at the housing second opening.

7. Apparatus for monitoring and controlling flight of an aircraft comprising:
    an upper port in an upper surface of a wing portion;
    a lower port in a lower surface of the wing portion;
    a first differential pressure sensor connected between the upper port and the lower port, the first differential pressure sensor adapted to sense a differential pressure between an air pressure acting at the upper port and an air pressure acting at the lower port;
    a leading edge port in the wing portion proximate a stagnation point of a leading edge of the wing portion;

a sampling port located within an unpressurized area of the aircraft; and a second differential pressure sensor connected between the leading edge port and the sampling port, the second differential pressure sensor adapted to sense a differential pressure between an air pressure acting proximate the stagnation point of the leading edge of the wing portion and an air pressure acting at the sampling port.

8. Apparatus for monitoring and controlling flight of an aircraft comprising:

a first port in a wing portion proximate a stagnation point of a leading edge of the wing portion;

a second port located within an unpressurized area of the aircraft; and a differential pressure sensor connected between the first port and the second port, the differential pressure sensor adapted to sense a differential pressure between an air pressure acting at the first port and an air pressure acting at the second port.

\* \* \* \* \*